(12) United States Patent
Matsumura et al.

(10) Patent No.: US 11,197,473 B2
(45) Date of Patent: Dec. 14, 2021

(54) VITRIFIED STATE STABILIZING AGENT FOR ANIMAL CELL CRYOPRESERVATION SOLUTION

(71) Applicant: JAPAN ADVANCED INSTITUTE OF SCIENCE AND TECHNOLOGY, Nomi (JP)

(72) Inventors: Kazuaki Matsumura, Nomi (JP); Manato Suzuki, Nomi (JP)

(73) Assignee: JAPAN ADVANCED INSTITUTE OF SCIENCE AND TECHNOLOGY, Ishikawa (JP)

( * ) Notice: Subject to any disclaimer, the term of this patent is extended or adjusted under 35 U.S.C. 154(b) by 42 days.

(21) Appl. No.: 15/577,944

(22) PCT Filed: Jul. 19, 2016

(86) PCT No.: PCT/JP2016/071169
§ 371 (c)(1),
(2) Date: Nov. 29, 2017

(87) PCT Pub. No.: WO2016/195121
PCT Pub. Date: Dec. 8, 2016

(65) Prior Publication Data
US 2018/0160676 A1    Jun. 14, 2018

(30) Foreign Application Priority Data

May 29, 2015 (JP) .............................. JP2015-110473
Feb. 9, 2016 (JP) .............................. JP2016-023010

(51) Int. Cl.
*A01N 1/02* (2006.01)
(52) U.S. Cl.
CPC ......... *A01N 1/0221* (2013.01); *A01N 1/0284* (2013.01)
(58) Field of Classification Search
None
See application file for complete search history.

(56) References Cited

U.S. PATENT DOCUMENTS

| | | | |
|---|---|---|---|
| 3,300,474 | A | 1/1967 | Flodin et al. |
| 9,826,732 | B2 * | 11/2017 | Matsumura .......... A01N 1/0221 |
| 2006/0134596 | A1 | 6/2006 | Sjogren et al. |
| 2011/0172315 | A1 | 7/2011 | Matsumura et al. |
| 2018/0160676 | A1 | 6/2018 | Matsumura et al. |

FOREIGN PATENT DOCUMENTS

| | | |
|---|---|---|
| JP | 2000-500327 | 1/2000 |
| JP | 2011-30557 | 2/2011 |
| JP | 2011-030557 | 2/2011 |
| JP | 2011-036196 | 2/2011 |
| JP | 2011030557 A * | 2/2011 |
| JP | 2012-217342 | 11/2012 |
| JP | 5630979 | 11/2014 |
| JP | 2016-220672 | 12/2016 |
| WO | 97/14785 | 4/1997 |
| WO | WO-2009157209 A1 * | 12/2009 ........... A01N 1/0221 |

OTHER PUBLICATIONS

International Preliminary Report on Patentability (Form PCT/IB/338) issued in counterpart International Application No. PCT/JP2016/071169 dated Dec. 14, 2017, with Form PCT/IB/373 and PCT/ISA/237 (9 pages).
International Search Report dated Oct. 18, 2016 in corresponding PCT Application No. PCT/JP2016/071169.
Written Opinion of the International Searching Authority dated Oct. 18, 2016 in corresponding PCT Application No. PCT/JP2016/071169.
Kazuaki Matsumum, "Development of polymer cryoprotectants and their biomedical applications", The 36th Annual Meeting of the Japanese Society for Biomaterials Yokoshu, 2014 Nen 11 Gatsu, p. 166, with English Translation.
Masato Suzuki et al., "Development of polyampholyte having stabilization property of vitreous state", The 60th Seminar and Annual Meeting for Cryobiology and Cryotechnology Koen Yoshishu, May 30, 2015 (May 30, 2015), p. 19, with English Translation.
Masato Suzuki et al., "Cryoprotective effect of hydrophobic ampholyte polymer", The 37th Annual Meeting of Japanese Society for Biomaterials Yokoshu, Nov. 9, 2015 (Nov. 9, 2015), p. 284, with English Translation.
Sigma webpage https://www.sigmaaldrich.com/technical-documents/protocols/biology/ficoll-400.html (2021) downloaded Apr. 27, 2021 (Year: 2021).
International Search Report dated May 9, 2017 issued in International (PCT) Application No. PCT/JP2017/005592.
Notification of Transmittal of Copies Translation of the International Preliminary Report of Patentability (Chapter I or Chapter II) (Form PCT/IB/338) issued in counterpart Internal Application No. PCT/JP2017/005592 dated Aug. 30, 2018 with Forms PCT/IB/373 and PCT/ISA/237, 8 pages.

(Continued)

Primary Examiner — Nghi V Nguyen
(74) Attorney, Agent, or Firm — Wenderoth, Lind & Ponack, L.L.P.

(57) ABSTRACT

Provided are a vitrification stabilizer for animal cell cryopreservation fluid, and an animal cell cryopreservation fluid that exhibits superior vitrification capacity due to containing said vitrification stabilizer for animal cell cryopreservation fluid. The vitrification stabilizer for animal cell cryopreservation fluid contains an amphoteric polymer compound selected from the group consisting of: (a) an amphoteric polymer compound obtained by reacting ε-poly-L-lysine with butyl succinic acid anhydride and performing carboxylation; (b) an amphoteric polymer compound obtained by reacting ε-poly-L-lysine with butyl succinic acid anhydride and succinic acid anhydride, and performing carboxylation; and (c) an amphoteric polymer compound obtained by reacting ε-poly-L-lysine with a compound represented by formula (I) and performing carboxylation.

12 Claims, 34 Drawing Sheets

(56) References Cited

OTHER PUBLICATIONS

Office Action dated Aug. 18, 2021 in Japanese Patent Application No. 2018-500176, with English-language translation.

* cited by examiner

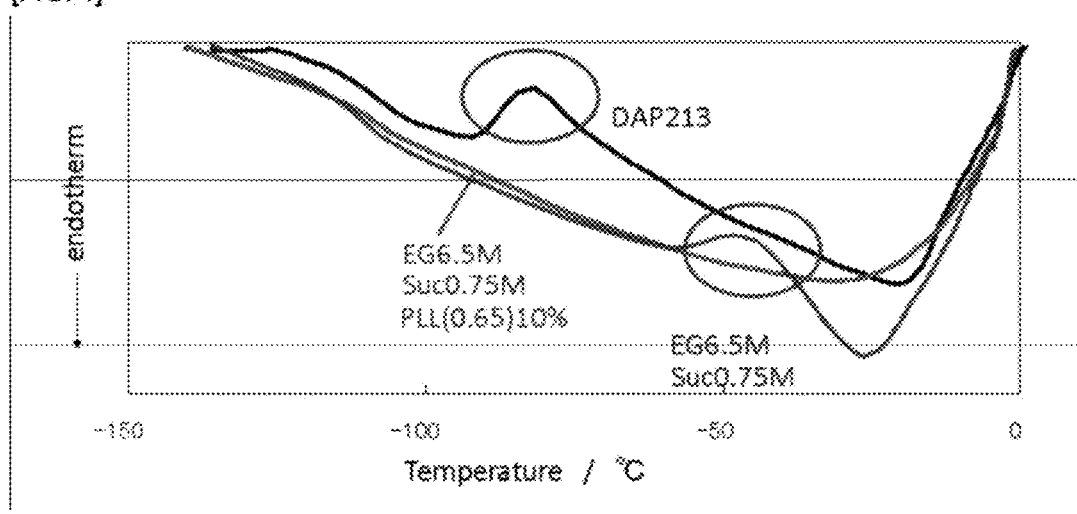
[FIG. 1]

[FIG 2a]
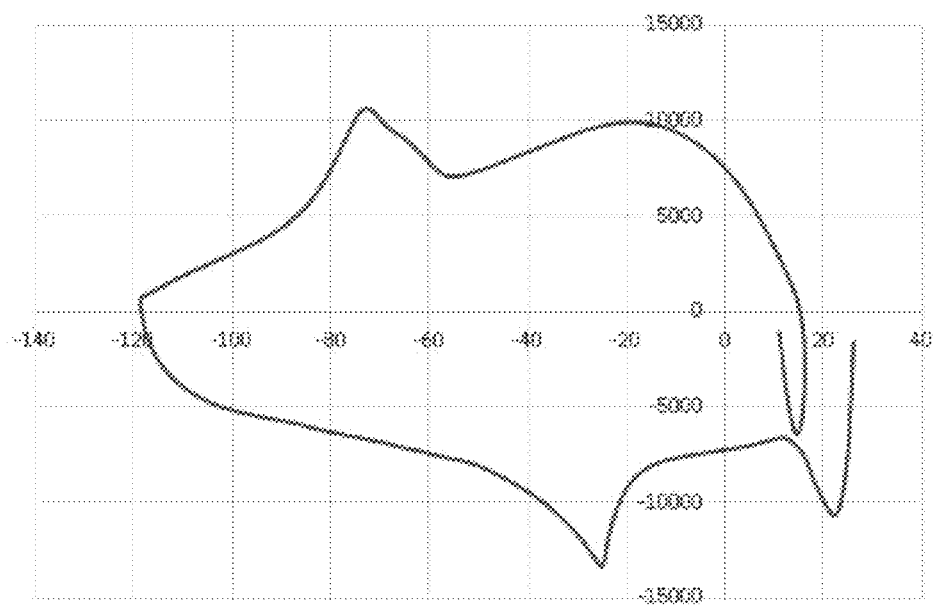

[FIG. 2b]
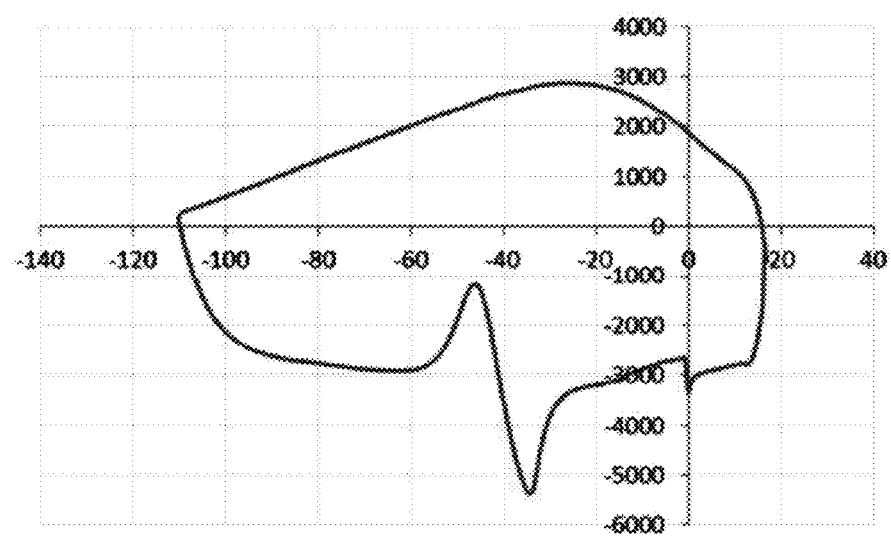

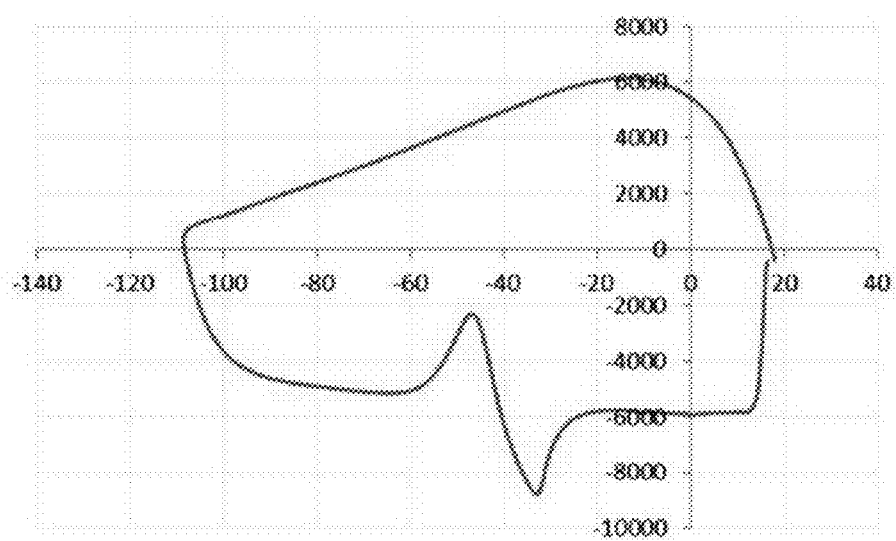
[FIG. 2c]

[FIG. 3a]
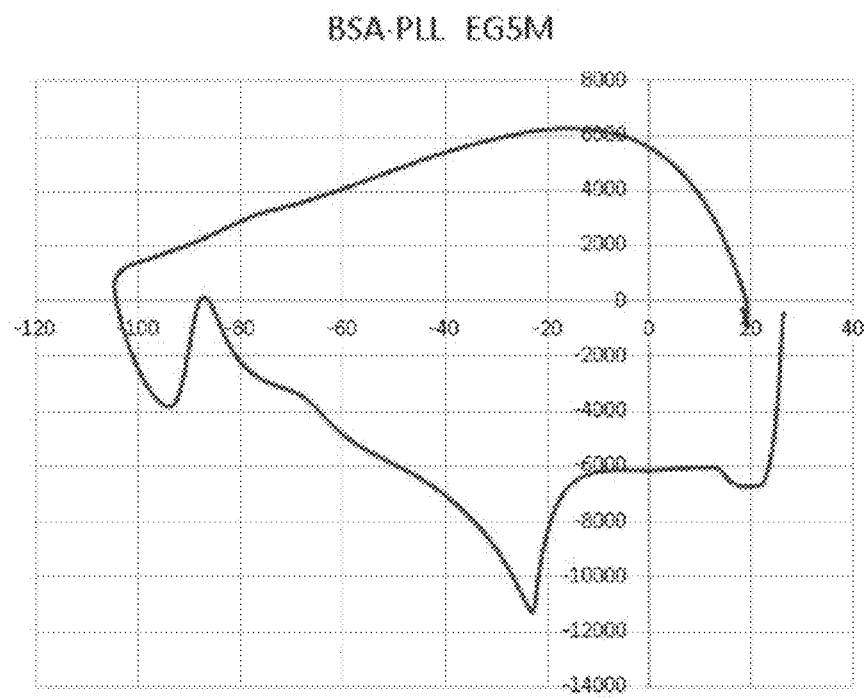

[FIG. 3b]
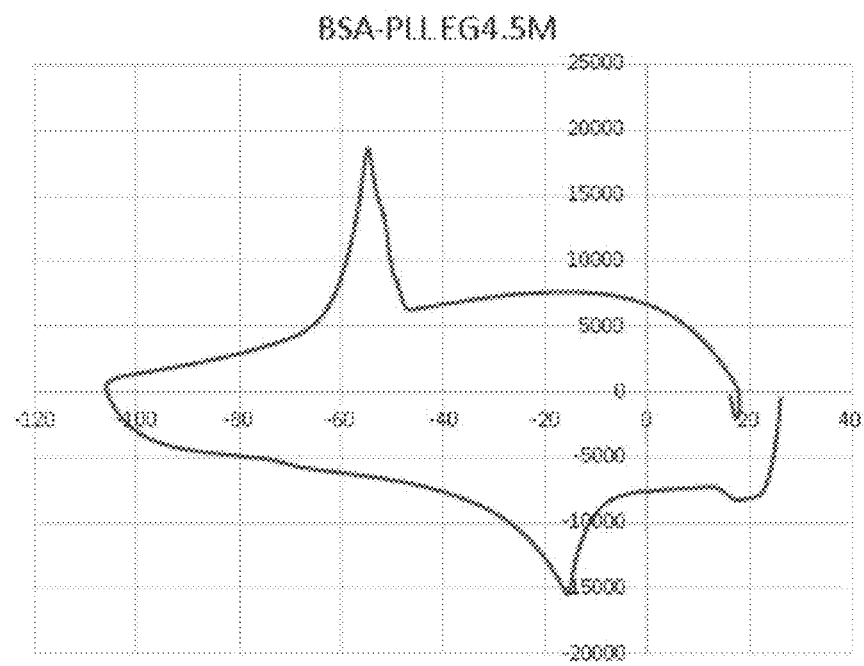

[FIG. 4]
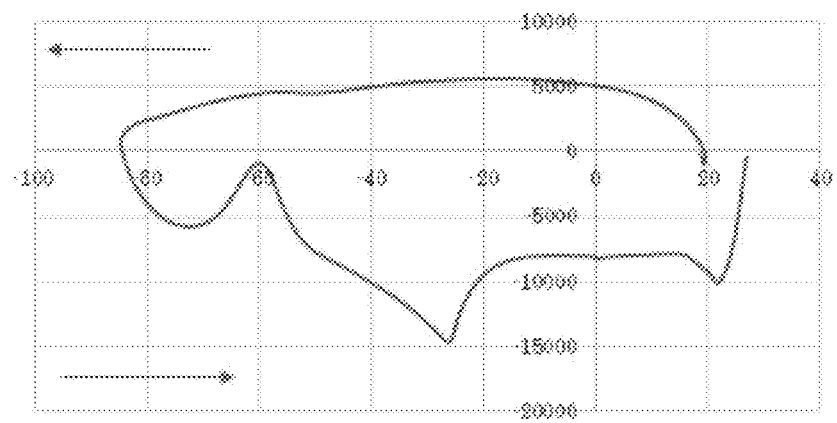

[FIG. 5a]
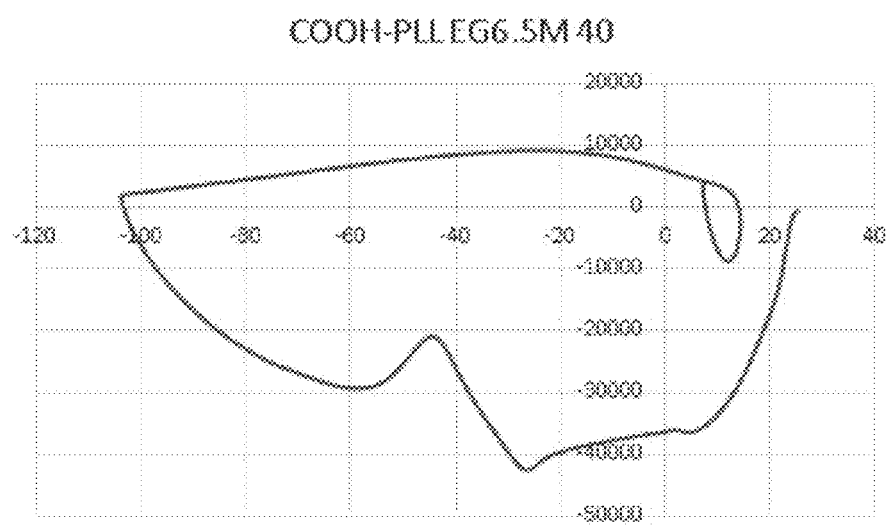

[FIG. 5b]
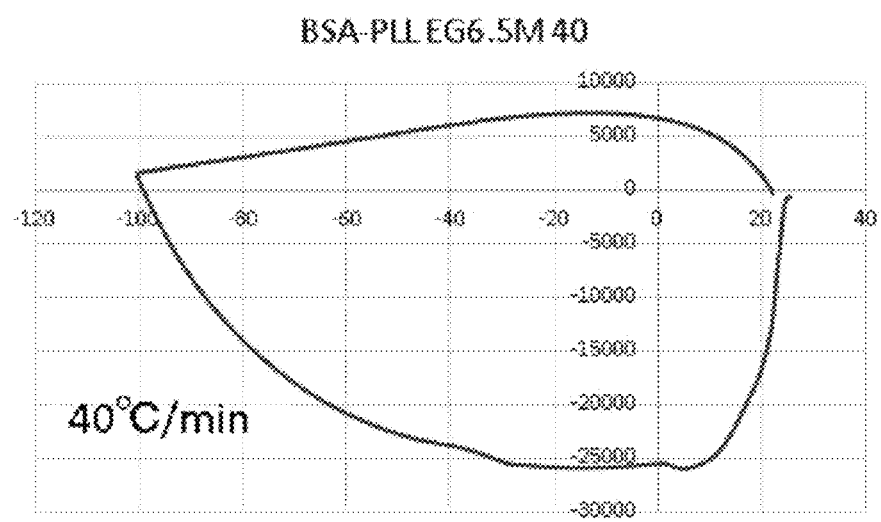

[FIG. 5c]
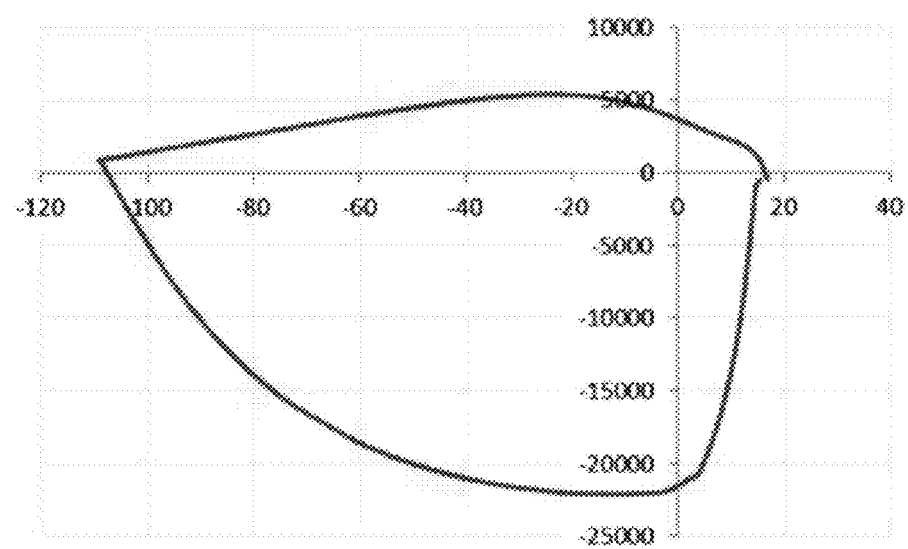

[FIG. 6a]
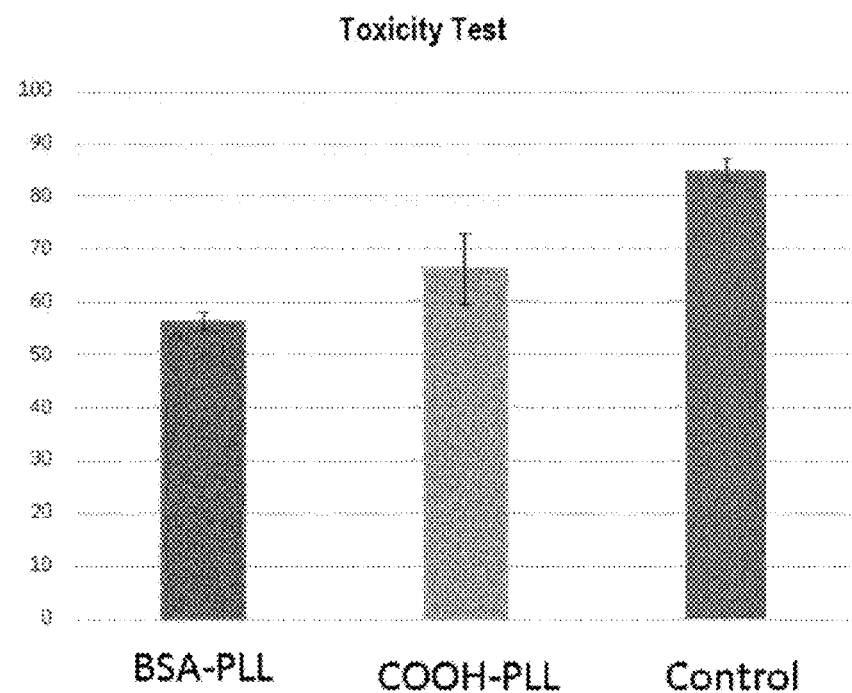

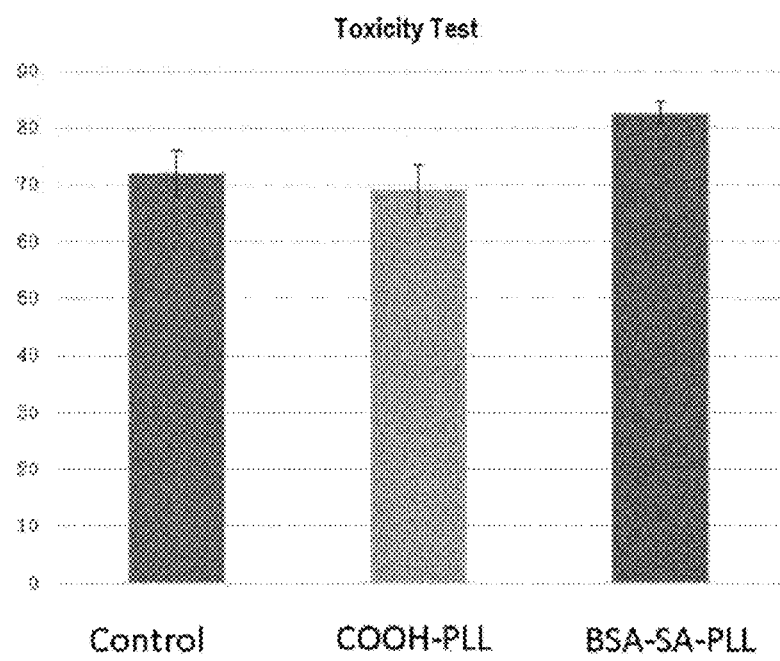
[FIG. 6b]

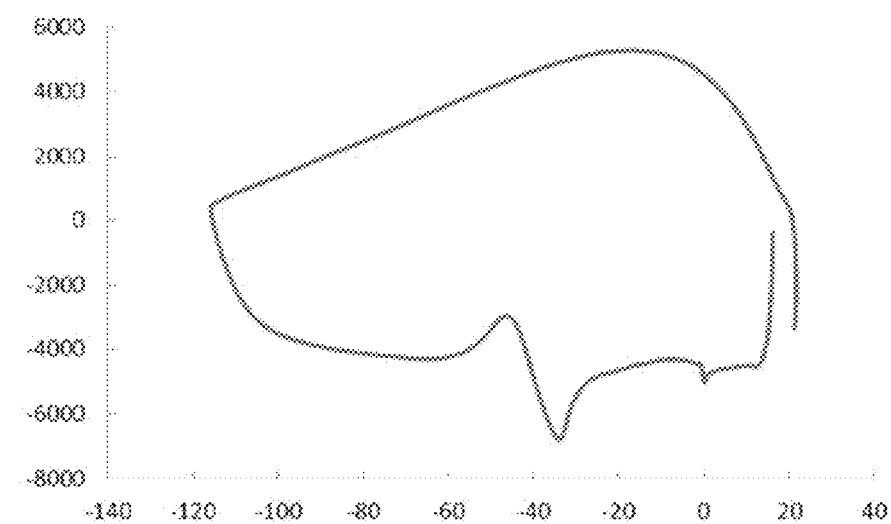

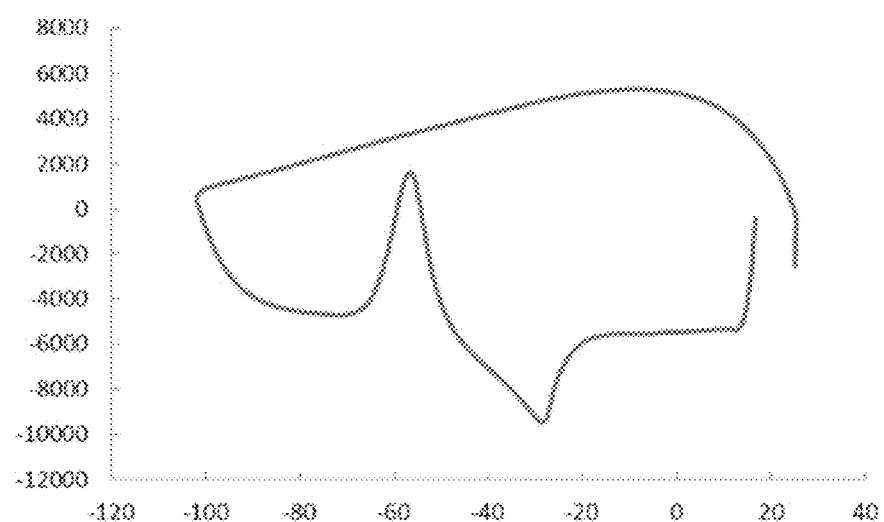
[FIG. 7b]

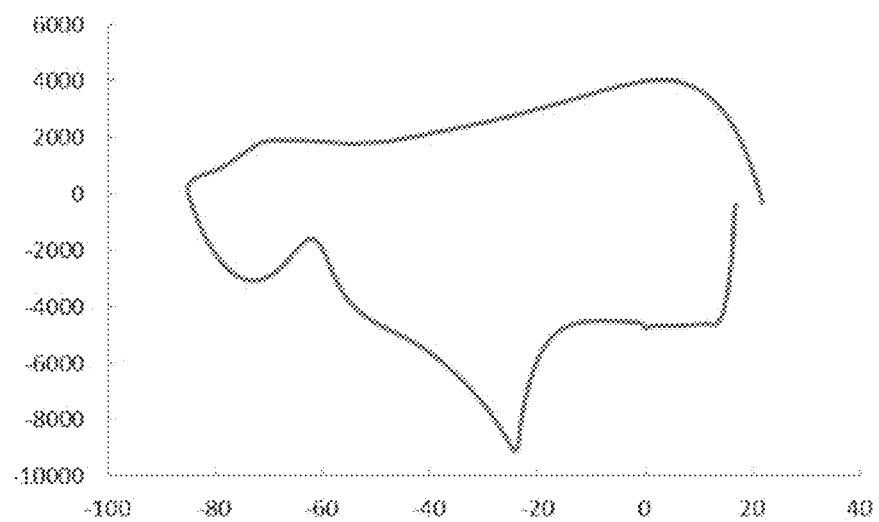

[FIG. 7d]
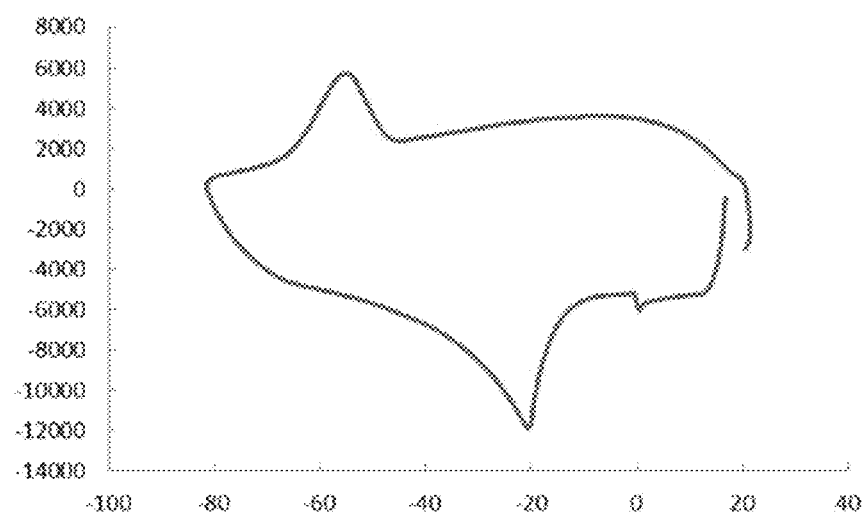

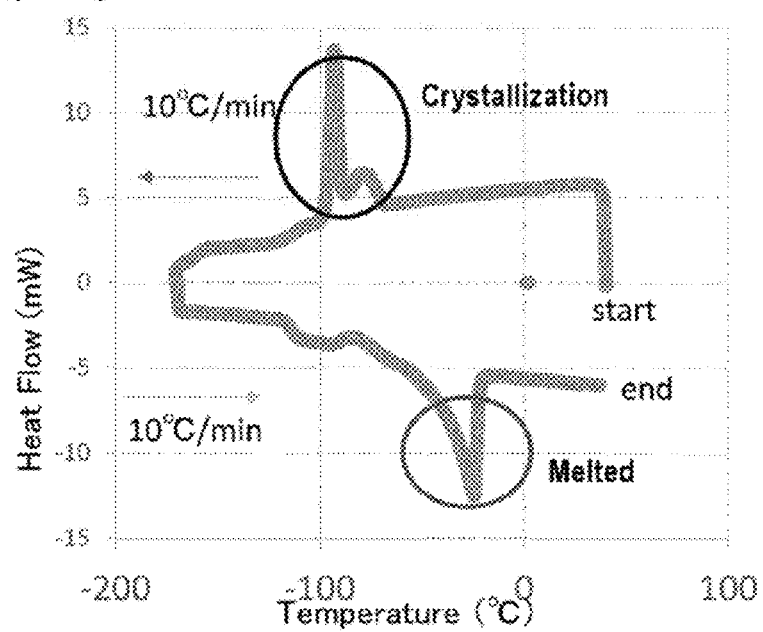

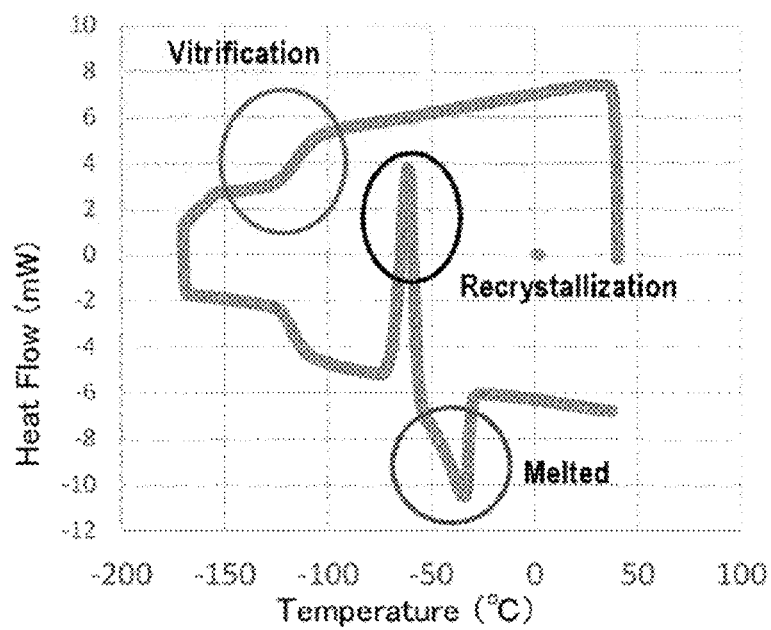

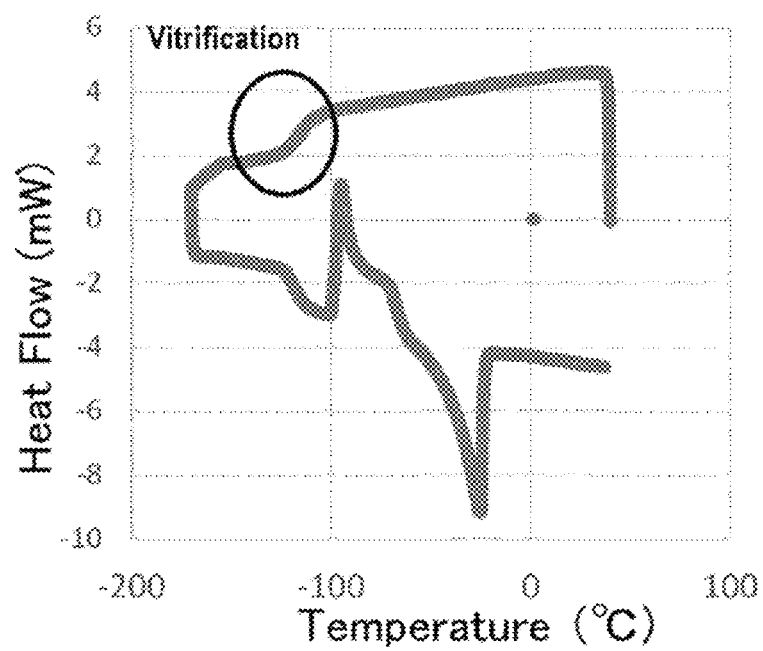
[FIG. 10a]

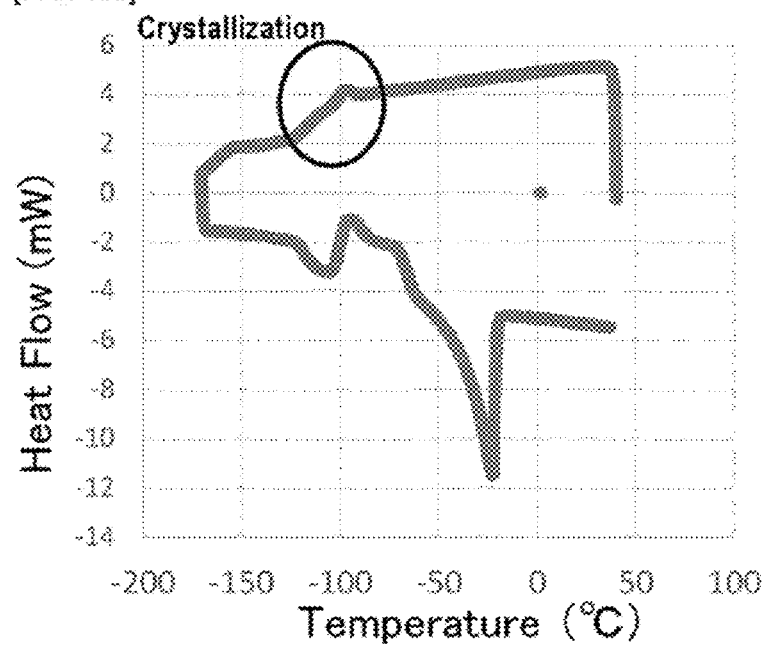
[FIG. 10b]

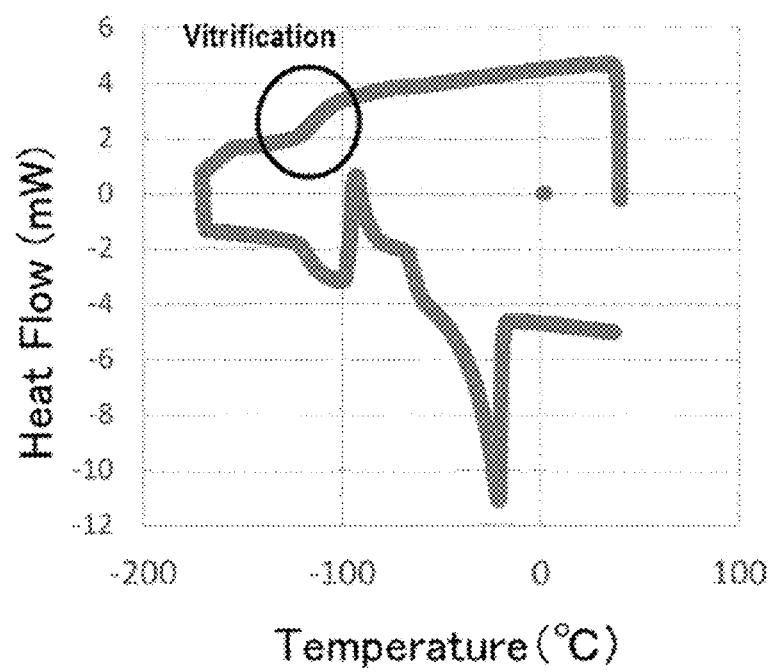

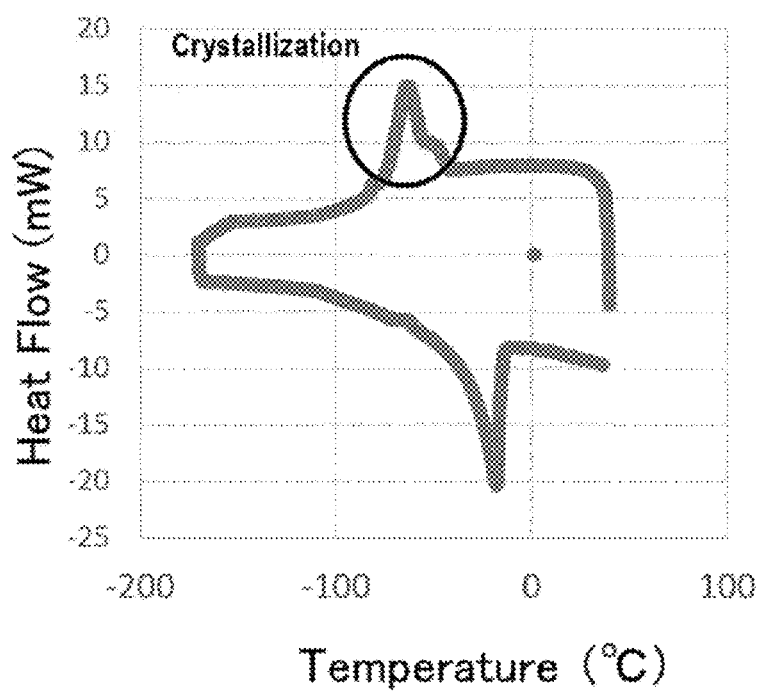
[FIG. 11b]

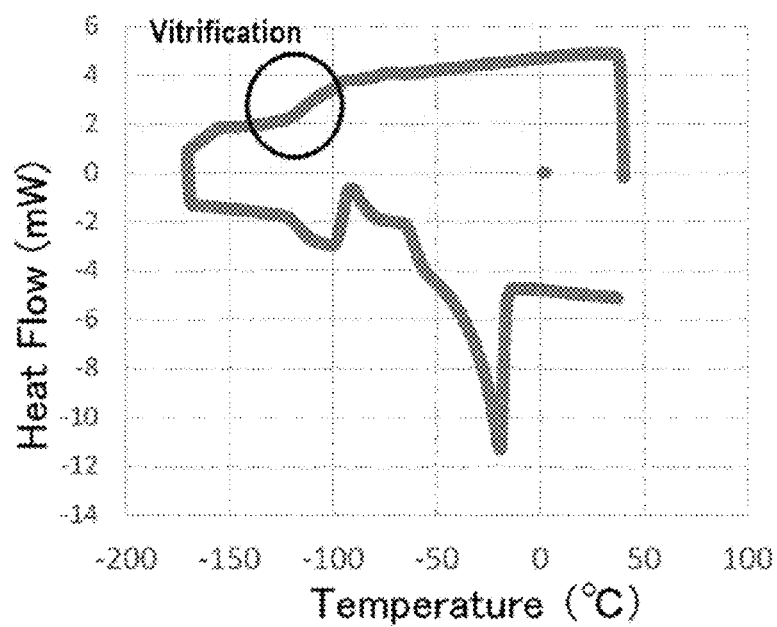
[FIG. 12a]

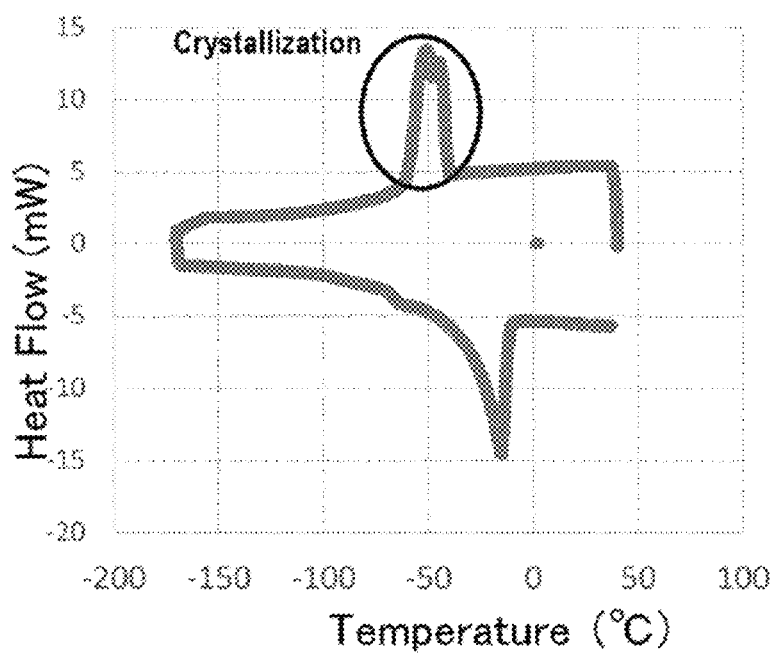
[FIG. 12b]

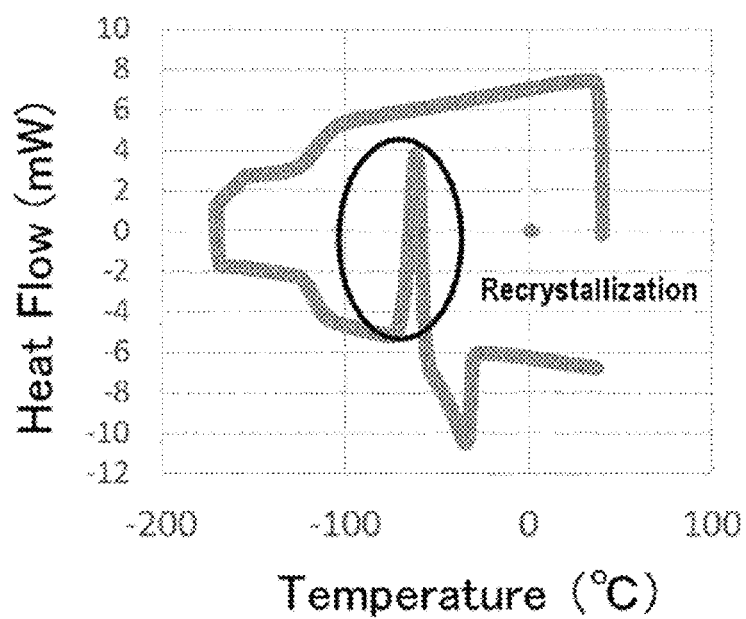
[FIG. 13a]

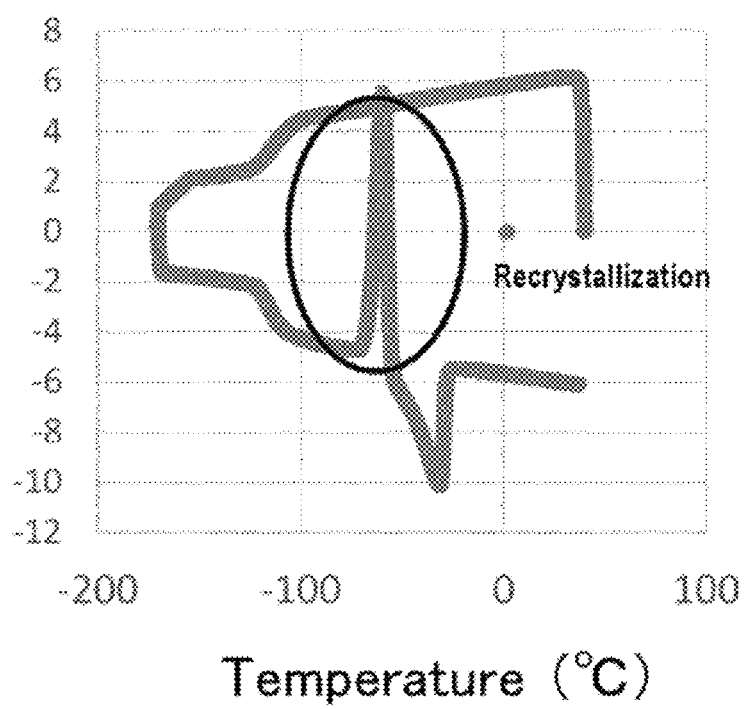
[FIG. 13b]

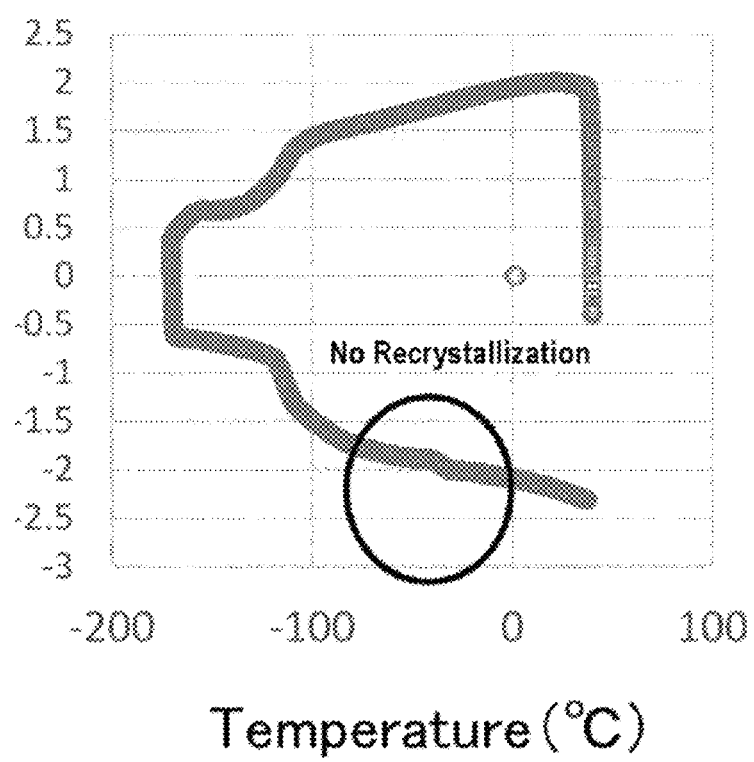
[FIG. 13c]

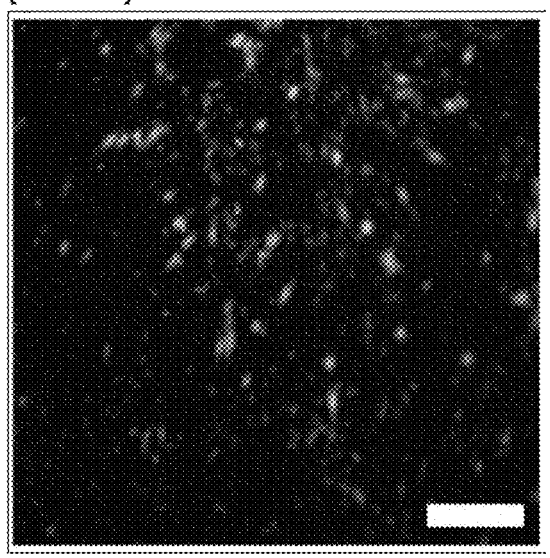
[FIG. 14a]

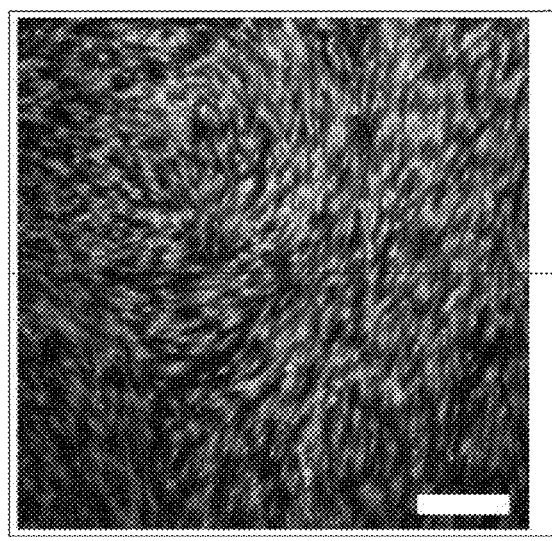
[FIG. 14b]

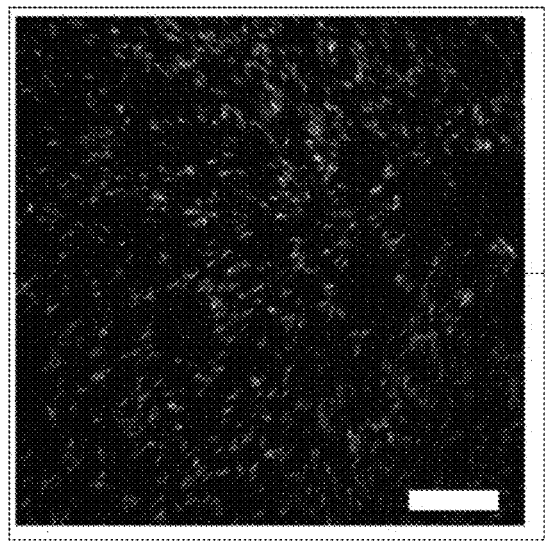
[FIG. 14c]

[FIG. 14d]
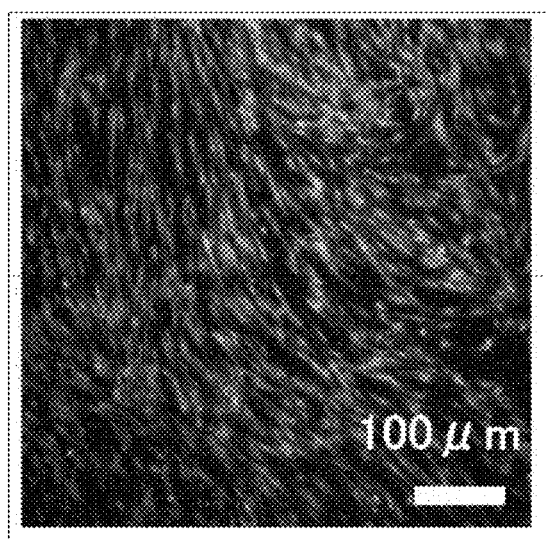

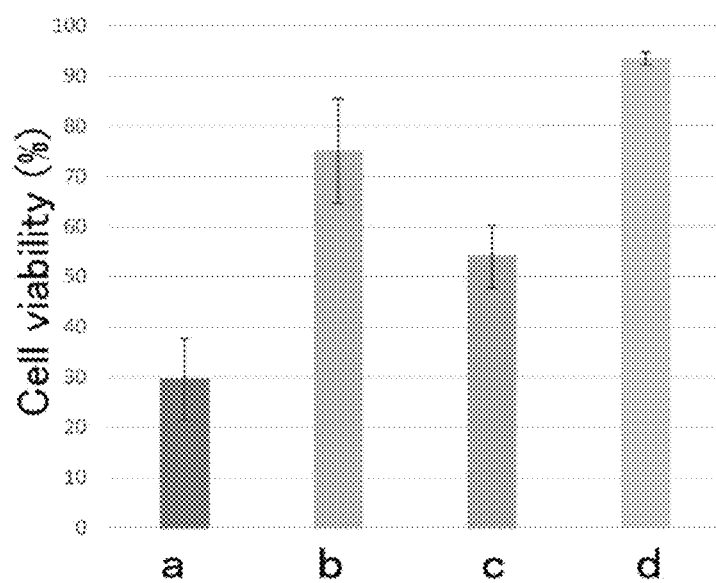
[FIG. 15]

[FIG. 16]
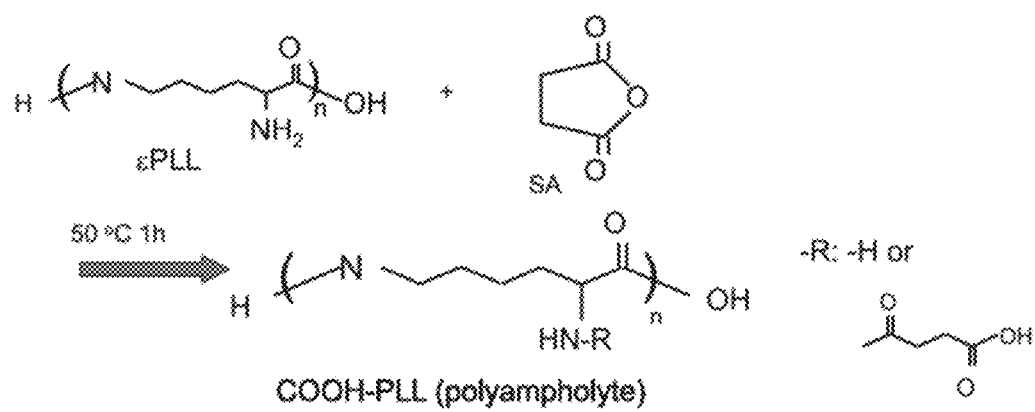

[FIG. 17]
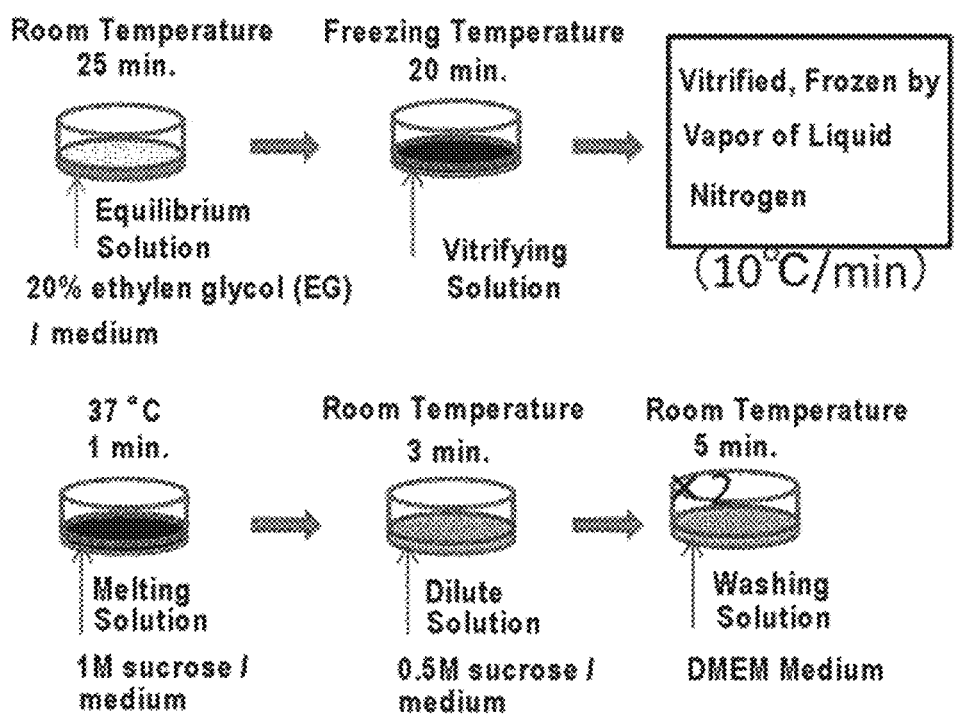

VITRIFIED STATE STABILIZING AGENT FOR ANIMAL CELL CRYOPRESERVATION SOLUTION

TECHNICAL FIELD

The present invention relates to a vitrified state stabilizing agent for an animal cell cryopreservation solution and an animal cell cryopreservation solution containing the vitrified state stabilizing agent.

BACKGROUND ART

Recently, expectations for clinical applications of regenerative medicines have increased. For the purpose, a basic technique has been required for cryopreserving cells, cell sheets, three-dimensional cell structures and tissues. Such a technique includes cryopreserving the targets while adding a cryoprotectant to prevent damage to the targets. As such a cryoprotectant, dimethyl sulfoxide (DMSO) (O=S(CH)$_2$), glycerin and the like are known.

DMSO and glycerin have been sufficiently proven for use in cryopreservation for dispersed cells. However, when used in cryopreservation for the cell sheets, three-dimensional cell structures, tissues and the like, DMSO and glycerin often cause a damaged state after thawing, leaving damage. Based on consideration that the damage might be caused by ice crystal formation or dewatering shrinkage during freezing, a vitrifying method has been attempted, which controls ice crystallization and allows solidification in an amorphous state.

The vitrifying method has been developed as a method of freezing fertilized eggs, and the conventional vitrifying method is generally intended to vitrify an aqueous solution by a rapid freezing rate and high concentration of a solute. For example, DAP 213 is known as the vitrifying solution for fertilized eggs of mice. DAP 213 is a solution containing 2 M of DMSO, 1 M of acetamide and 3 M of propylene glycol, which has high concentration and high toxicity. A typical use is to replace water contained in the fertilized eggs of mice with the solution and directly immerse them in liquid nitrogen to provide a vitrified state. However, vitrification with such a vitrifying solution would result in higher cytotoxicity and further higher damage due to recrystallization during thawing.

Therefore, the present inventors have made an attempt to improve the vitrifying method by investigating the cryoprotectants (Patent Document 1).

CITATION LIST

Patent Literature

Japanese Patent No. 5630979 B1

SUMMARY OF INVENTION

Technical Problem

The cryopreservation solution containing carboxylated polylysine disclosed in Patent Document 1 exhibits good vitrification ability, but there is a need for a novel cryopreservation solution having improved vitrification ability.

Accordingly, an object of the present invention is to provide a novel animal cell cryopreservation solution having improved vitrification ability.

Solution to Problem

As a result of intensive studies, the present inventors have found that the above object can be achieved by an animal cell cryopreservation solution using an polyampholyte shown below as a vitrified state stabilizing agent for an animal cell cryopreservation solution, and have completed the present invention.

Thus, the present invention includes the following aspects (1) to (14):

(1)

A vitrified state stabilizing agent for an animal cell cryopreservation solution, comprising at least one polyampholyte comprising amino groups and carboxyl groups in the same molecule, selected from the group consisting of the following (a), (b) and (c):

(a) at least one carboxylated polyampholyte resulting from reaction of ε-poly-L-lysine with butylsuccinic anhydride;

(b) at least one carboxylated polyampholyte resulting from reaction of ε-poly-L-lysine with butylsuccinic anhydride and succinic anhydride; or (c) at least one carboxylated polyampholyte resulting from reaction of ε-poly-L-lysine with a compound represented by the following formula (I):

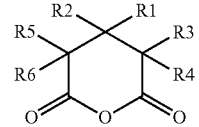

Formula (I)

in which:
R1 and R2 each independently represents a hydrogen atom or a C1 to C4 alkyl group, or R1 and R2 together form a C1 to C6 alkane-diyl group;
R3 and R4 each independently represents a hydrogen atom or a C1 to C4 alkyl group, or R3 and R4 together form a C1 to C6 alkane-diyl group;
R5 and R6 each independently represents a hydrogen atom or a C1 to C4 alkyl group, or R5 and R6 together form a C1 to C6 alkane-diyl group.

(2)

The vitrified state stabilizing agent for the animal cell cryopreservation solution according to the aspect (1), wherein the compound represented by the formula (I) comprises a compound represented by the following formula (II):

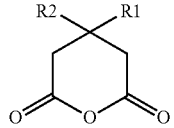

Formula (II)

in which:
R1 and R2 each independently represents a hydrogen atom or a C1 to C4 alkyl group, or R1 and R2 together form a C1 to C6 alkane-diyl group.

(3)

The vitrified state stabilizing agent for the animal cell cryopreservation solution according to the aspect (1) or (2), wherein the at least one polyampholyte has a percentage of carboxylated amino groups among the amino groups in the side chains of ε-poly-L-lysine, in the range of from 50% to 75%.

(4)

The vitrified state stabilizing agent for the animal cell cryopreservation solution according to any one of the aspects (1) to (3), wherein the at least one carboxylated polyampholyte resulting from reaction of ε-poly-L-lysine with butylsuccinic anhydride and succinic anhydride has a ratio B/A of a number B of carboxylated amino groups resulting from reaction with butylsuccinic anhydride among the amino groups in the side chains of ε-poly-L-lysine to a number A of carboxylated amino acids resulting from reaction with succinic anhydride among the amino groups in the side chains of ε-poly-L-lysine, in the range of from 2/30 to 40/30.

(5)

An animal cell cryopreservation solution comprising a physiological solution containing the vitrified state stabilizing agent for the animal cell cryopreservation solution according to any one of the aspects (1) to (4).

(6)

An animal cell cryopreservation solution comprising a physiological solution containing 2 to 40% by weight of the vitrified state stabilizing agent for the animal cell cryopreservation solution according to any one of the aspects (1) to (4), and containing ethylene glycol or propylene glycol at a concentration of from 3 to 8 M.

(7)

The animal cell cryopreservation solution according to the aspect (6), further containing sucrose at a concentration of from 0.1 to 1 M.

(8)

The animal cell cryopreservation solution according to any one of the aspects (5) to (7), wherein the animal cell cryopreservation solution comprises an animal cell vitrified state cryopreservation solution.

(9)

A method for cryopreserving animal cells, comprising the steps of:
immersing the animal cells in the animal cell cryopreservation solution according to any one of the aspects (5) to (8); and
freezing the animal cells in the animal cell cryopreservation solution by lowering a temperature.

(10)

The method for cryopreserving the animal cells according to the aspect (9), further comprising, after the step of freezing the animal cells in the animal cell cryopreservation solution by lowering the temperature, a step of thawing the frozen animal cells in the animal cell cryopreservation solution by elevating a temperature.

(11)

The method for cryopreserving the animal cells according to the aspect (9) or (10), wherein the step of freezing the animal cells in the animal cell cryopreservation solution by lowering the temperature comprises freezing the animal cells in a vitrified state by lowering the temperature.

(12)

The method for cryopreserving the animal cells according to the aspect (10) or (11), wherein the step of thawing the frozen animal cells in the animal cell cryopreservation solution by elevating the temperature comprises thawing the animal cells by elevating the temperature without recrystallization.

(13)

The method for cryopreserving the animal cells according to any one of the aspects (9) to (12), wherein the step of freezing the animal cells in the animal cell cryopreservation solution by lowering the temperature comprises freezing the animal cells by lowering the temperature at a cooling rate of from 5° C./min to 50° C./min.

(14)

The method for cryopreserving the animal cells according to any one of the aspects (10) to (13), wherein the step of thawing the frozen animal cells in the animal cell cryopreservation solution by elevating the temperature comprises thawing the frozen animal cells by elevating the temperature at a heating rate of from 5° C./min to 100° C./min.

Advantageous Effects of Invention

According to the present invention, an animal cell cryopreservation solution having improved vitrification ability can be obtained. The use of the animal cell cryopreservation solution can result in suppression of crystallization even at a slower heating rate than that of prior art, allowing cryopreservation while maintaining the vitrified state. Further, it can result in suppression of recrystallization even during the temperature elevating, allowing thawing while stably maintaining the vitrified state. Therefore, according to the animal cell cryopreservation solution of the present invention, animal cells can be frozen and thawed with higher viability.

BRIEF DESCRIPTION OF DRAWINGS

FIG. 1 is a graph showing results of DSC measurement of conventional vitrifying solutions at a heating rate of 50° C./min.

FIG. 2a is a graph showing a result of crystallization evaluation by DSC measurement of a vitrifying solution containing COOH-PLL.

FIG. 2b is a graph showing a result of crystallization evaluation by DSC measurement of a vitrifying solution containing BSA-PLL.

FIG. 2c is a graph showing a result of crystallization evaluation by DSC measurement of a vitrifying solution containing BSA(35)-SA(30)-PLL.

FIG. 3a is a graph showing a result of crystallization evaluation by DSC measurement of a vitrifying solution containing BSA-PLL, EG5M.

FIG. 3b is a graph showing a result of crystallization evaluation by DSC measurement of a vitrifying solution containing BSA-PLL, EG4.5M.

FIG. 4 is a graph showing a result of crystallization evaluation by DSC measurement of a vitrifying solution containing BSA(35)-SA(30)-PLL, EG5.5 M.

FIG. 5a is a graph showing a result of recrystallization evaluation by DSC measurement of a vitrifying solution containing COOH-PLL.

FIG. 5b is a graph showing a result of recrystallization evaluation by DSC measurement of a vitrifying solution containing BSA-PLL.

FIG. 5c is a graph showing a result of recrystallization evaluation by DSC measurement of a vitrifying solution containing BSA(35)-SA(30)-PLL.

FIG. 6a is a graph showing cell viability according to the respective vitrifying solutions.

FIG. 6b is a graph showing cell viability according to the respective vitrifying solutions.

FIG. 7a is a graph showing a result of crystallization evaluation by DSC measurement of a vitrifying solution containing DMGA-PLL, EG6M.

FIG. 7b is a graph showing a result of crystallization evaluation by DSC measurement of a vitrifying solution containing DMGA-PLL, EG5M.

FIG. 7c is a graph showing a result of crystallization evaluation by DSC measurement of a vitrifying solution containing DMGA-PLL, EG4.5M.

FIG. 7d is a graph showing a result of crystallization evaluation by DSC measurement of a vitrifying solution containing DMGA-PLL, EG4M.

FIG. 8 is a graph showing a result of crystallization evaluation by DSC measurement of a vitrifying solution containing EG6.5M.

FIG. 9 is a graph showing a result of crystallization evaluation by DSC measurement of a vitrifying solution containing COOH-PLL, EG6.5M.

FIG. 10a is a graph showing a result of crystallization evaluation by DSC measurement of a vitrifying solution containing COOH-PLL, EG5.5M.

FIG. 10b is a graph showing a result of crystallization evaluation by DSC measurement of a vitrifying solution containing COOH-PLL, EG5M.

FIG. 11a is a graph showing a result of crystallization evaluation by DSC measurement of a vitrifying solution containing BSA-PLL, EG5M.

FIG. 11b is a graph showing a result of crystallization evaluation by DSC measurement of a vitrifying solution containing BSA-PLL, EG4.5M.

FIG. 12a is a graph showing a result of crystallization evaluation by DSC measurement of a vitrifying solution containing DMGA-PLL, EG4.5M.

FIG. 12b is a graph showing a result of crystallization evaluation by DSC measurement of a vitrifying solution containing DMGA-PLL, EG4M.

FIG. 13a is a graph showing a result of crystallization evaluation by DSC measurement of a vitrifying solution containing COOH-PLL, EG6M.

FIG. 13b is a graph showing a result of crystallization evaluation by DSC measurement of a vitrifying solution containing BSA-PLL, EG6M.

FIG. 13c is a graph showing a results of crystallization evaluation by DSC measurement of a vitrifying solution containing DMGA-PLL, EG6M.

FIG. 14a is a fluorescence microscopy photograph of a double-stained cell sheet frozen and thawed with a vitrifying solution containing EG6M.

FIG. 14b is a fluorescence microscopy photograph of a double-stained cell sheet frozen and thawed with a vitrifying solution containing COOH-PLL, EG6M.

FIG. 14c is a fluorescence microscopy photograph of a double-stained cell sheet frozen and thawed with a vitrifying solution containing BSA-PLL, EG6M.

FIG. 14d is a fluorescence microscopy photograph of a double-stained cell sheet frozen and thawed with a vitrifying solution containing DMGA-PLL, EG6M.

FIG. 15 is a graph showing cell viability after freezing and thawing cells in the respective vitrifying solutions.

FIG. 16 is a drawing illustrating the reaction formula for synthesis of the COOH-PLL.

FIG. 17 is an explanatory diagram showing an outline of the procedures of the experiment of Example 8.

DESCRIPTION OF THE PREFERRED EMBODIMENTS

The present invention will be described in detail below with reference to specific embodiments. The present invention is not limited to the following specific embodiments.

[Vitrified State Stabilizing Agent for Animal Cell Cryopreservation Solution]

The present invention relates to a vitrified state stabilizing agent for an animal cell cryopreservation solution, comprising at least one polyampholyte comprising amino groups and carboxyl groups in the same molecule, selected from the group consisting of the following (a), (b) and (c):

(a) at least one carboxylated polyampholyte resulting from reaction of ε-poly-L-lysine with butylsuccinic anhydride;
(b) at least one carboxylated polyampholyte resulting from reaction of ε-poly-L-lysine with butylsuccinic anhydride and succinic anhydride; or
(c) at least one carboxylated polyampholyte resulting from reaction of ε-poly-L-lysine with a compound represented by the formula (I):

Formula (I)

in which:
R1 and R2 each independently represents a hydrogen atom or a C1 to C4 alkyl group, or R1 and R2 together form a C1 to C6 alkane-diyl group;
R3 and R4 each independently represents a hydrogen atom or a C1 to C4 alkyl group, or R3 and R4 together form a C1 to C6 alkane-diyl group;
R5 and R6 each independently represents a hydrogen atom or a C1 to C4 alkyl group, or R5 and R6 together form a C1 to C6 alkane-diyl group.

[ε-poly-L-lysine]

For the ε-poly-L-lysine, known ε-poly-L-lysine may be used. The ε-poly-L-lysine may have a molecular weight of 100 to 100,000, and in a preferred embodiment, the ε-poly-L-lysine that can be used includes those having number average molecular weights of, for example 1,000 to 20,000 and 1,000 to 10,000, produced by microorganisms or enzymes. The ε-poly-L-lysine is produced by actinomycete belonging to the genus *Streptomyces* and is exclusively used as a food additive. Further, attempts have been made to produce ε-poly-L-lysine having a degree of polymerization of 20 or less, in addition to a degree of polymerization of 15 to 35. The number average molecular weight or the number average degree of polymerization can be easily measured by SDS-PAGE (sodium dodecyl sulfate-polyacrylamide gel electrophoresis), for example using an electrophoresis apparatus and a densitograph (model AE-6920V) available from ATTO Corporation. It is also possible to use those having a molecular weight of 30,000 or more obtained by increasing the molecular weight with heat treatment. The polylysine having a free carboxyl group only at its terminal contains primary amino groups in its side chains, and the amino groups are carboxylated by the reaction that will be described below.

[Carboxylation of Amino Group of ε-Poly-L-Lysine]

The polyampholyte comprising amino groups and carboxyl groups in the same molecule can have a percentage of carboxylated amino groups among the amino groups in the side chains of ε-poly-L-lysine, for example in the range of from 50% to 75%, or in the range of from 60% to 70%.

[BSA-PLL]

As shown in the chemical reaction formula described in Examples, butylsuccinic anhydride (BSA) reacts with the amino groups in the side chains of ε-poly-L-lysine (PLL) to form a carboxylated polyampholyte (BSA-PLL) which is the polyampholyte comprising amino groups and carboxyl groups in the same molecule and is the vitrified state stabilizing agent for the animal cell cryopreservation solution according to the present invention.

[BSA-SA-PLL]

The amino groups in the side chains of ε-poly-L-lysine (PLL) reacts with butylsuccinic anhydride (BSA) and succinic anhydride (SA) to form a carboxylated polyampholyte (BSA-SA-PLL) which is the polyampholyte comprising amino groups and carboxyl groups in the same molecule and is the vitrified state stabilizing agent for the animal cell cryopreservation solution according to the present invention. Butylsuccinic anhydride and succinic anhydride may simultaneously react with ε-poly-L-lysine, or one of butylsuccinic anhydride and succinic anhydride may firstly react with ε-poly-L-lysine and other may then react with ε-poly-L-lysine. A ratio B/A of a number B of carboxylated amino groups resulting from reaction with butylsuccinic anhydride among the amino groups in the side chains of ε-poly-L-lysine to a number A of carboxylated amino groups resulting from reaction with succinic anhydride among the amino groups in the side chains of ε-poly-L-lysine may be in the range of from 2/30 to 40/30, in the range of from 10/30 to 40/30, or in the range of form 30/40 to 40/30.

[GA-PLL]

A GA derivative (a glutaric anhydride derivative) represented by the following formula I reacts with the amino groups in the side chains of ε-poly-L-lysine to form a carboxylated polyampholyte (GA-PLL), which is the polyampholyte comprising amino groups and carboxyl groups in the same molecule and is the vitrified state stabilizing agent for the animal cell cryopreservation solution according to the present invention.

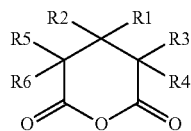

Formula (I)

In the formula as stated above, R1 and R2 can each independently represent a hydrogen atom or a C1 to C4 alkyl group, or R1 and R2 can together form a C1 to C6 alkane-diyl group. The C1 to C4 alkyl group may be, for example, a C1 to C3 or C1 to C2 alkyl group. Examples of the alkane-diyl group can include C1 to C3 alkane-1,1-diyl groups and C4 to C6 alkylene groups. Examples of the combination of R1 and R2 can include a hydrogen atom and a hydrogen atom; a hydrogen atom and a methyl group; a hydrogen atom and an ethyl group; a methyl group and a methyl group; a methyl group and an ethyl group; and an ethyl group and an ethyl group. Examples of the C1 to C3 alkane-1,1-diyl groups can include a methane-1,1-diyl group and an ethane-1,1-diyl group. Examples of the C4 to C6 alkylene groups can include a tetramethylene group (a butane-1,4-diyl group) and a pentamethylene group (a pentane-1,5-diyl group).

In the formula as stated above, R3 and R4 can each independently represent a hydrogen atom or a C1 to C4 alkyl group, or R3 and R4 can together form a C1 to C6 alkane-diyl group. The C1 to C4 alkyl group may be, for example, a C1 to C3 or C1 to C2 alkyl group. Examples of the alkane-diyl group can include C1 to C3 alkane-1,1-diyl groups and C4 to C6 alkylene groups. Examples of the combination of R3 and R4 can include a hydrogen atom and a hydrogen atom; a hydrogen atom and a methyl group; a hydrogen atom and an ethyl group; a methyl group and a methyl group; a methyl group and an ethyl group; and an ethyl group and an ethyl group. Examples of the C1 to C3 alkane-1,1-diyl groups can include a methane-1,1-diyl group and an ethane-1,1-diyl group. Examples of the C4 to C6 alkylene groups can include a tetramethylene group (a butane-1,4-diyl group) and a pentamethylene group (a pentane-1,5-diyl group).

In the formula as stated above, R5 and R6 can each independently represent a hydrogen atom or a C1 to C4 alkyl group, or R5 and R6 can together form a C1 to C6 alkane-diyl group. The C1 to C4 alkyl group may be, for example, a C1 to C3 or C1 to C2 alkyl group. Examples of the alkane-diyl group can include C1 to C3 alkane-1,1-diyl groups and C4 to C6 alkylene groups. Examples of the combination of R5 and R6 can include a hydrogen atom and a hydrogen atom; a hydrogen atom and a methyl group; a hydrogen atom and an ethyl group; a methyl group and a methyl group; a methyl group and an ethyl group; and an ethyl group and an ethyl group. Examples of the C1 to C3 alkane-1,1-diyl groups can include a methane-1,1-diyl group and an ethane-1,1-diyl group. Examples of the C4 to C6 alkylene groups can include a tetramethylene group (a butane-1,4-diyl group) and a pentamethylene group (a pentane-1,5-diyl group).

In a preferred embodiment, R1 and R2 may be the groups as defined above, and R3, R4, R5 and R6 may be hydrogen atoms, in the above formula. That is, the GA derivative may be represented by the following formula II.

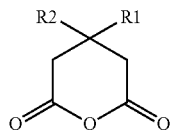

Formula (II)

In a preferred embodiment, R3 and R4 may be the groups as defined above, and R1, R2, R5 and R6 may be hydrogen atoms, in the above formula. That is, the GA derivative may be represented by the following formula. Needless to say, this GA derivative is equivalent to the GA derivative in which R5 and R6 are the groups as defined above, and R1, R2, R3 and R4 are hydrogen atoms, in the above formula.

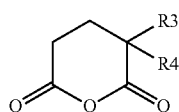

Formula (III)

Specific examples of such a GA derivative can include compounds having the following structures:

3,3-Dimethylglutaric Anhydride (DMGA)

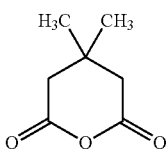

Glutaric Anhydride (GA)

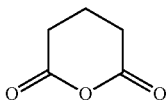

3-Methylglutaric Anhydride (MGA)

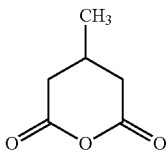

2,2-Dimethylglutaric Anhydride

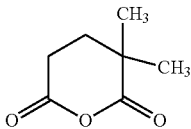

3,3-Tetramethylene Glutaric Anhydride

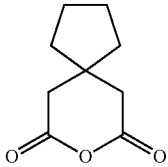

3-oxaspiro[5,5]undecane-2,4-dione
(3,3-pentamethylene glutaric anhydride)

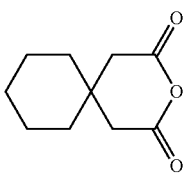 [SMILES: O=C1CC2(CCCCC2)CC(=O)O1]

[DMGA-PLL]

In a preferred embodiment, 3,3-dimethylglutaric anhydride (DMGA) can react with the amino groups in the side chains of ε-poly-L-lysine to provide a carboxylated polyampholyte (DMGA-PLL).

[Animal Cell Cryopreservation Solution]

The animal cell cryopreservation solution according to the present invention is a physiological solution containing the vitrified state stabilizing agent for the animal cell cryopreservation solution as defined above. Examples of the physiological solution can include, but not particularly limited to, physiological saline solutions having a known composition, PBS, cell culture media, and the like. The vitrified state stabilizing agent for the animal cell cryopreservation solution may be contained in the animal cell cryopreservation solution, for example, in an amount of from 2 to 40% by weight, from 3 to 30% by weight, or from 5 to 20% by weight. Alternatively, when the polyampholyte has a molecular weight of 2,000 to 20,000, the concentration of the vitrified state stabilizing agent may be from 1 to 100 mM, from 5 to 50 mM, or from 10 to 30 mM.

[Sucrose]

In a preferred embodiment, the animal cell cryopreservation solution may contain sucrose. The content of sucrose may be, for example, in the range of from 0.1 to 1 M, or from 0.3 to 0.6 M.

[Ethylene Glycol and Propylene Glycol]

In a preferred embodiment, the animal cell cryopreservation solution may contain ethylene glycol (EG) or propylene glycol (PG), preferably ethylene glycol. Although ethylene glycol or the like is an effective component for the animal cell cryopreservation solution, its decreased content is preferred in terms of cytotoxicity. According to the present invention, in order to be able to achieve a sufficiently improved vitrification ability while decreasing the content, the concentration of ethylene glycol to be used may be selected from, for example, ranges such as from 3 to 8 M, from 4 to 7 M, from 4.5 to 7 M, from 5 M to 7 M, 4 M or more and 4.5 M or more.

[Method for Cryopreserving Animal Cells]

The method for cryopreserving animal cells according to the present invention can be carried out by a method including the steps of immersing the animal cells in the animal cell cryopreservation solution and freezing the animal cells in the animal cell cryopreservation solution by lowering a temperature.

In a preferred embodiment, after the step of freezing the animal cells by lowering the temperature, the method according to the present invention can involve a step of thawing the frozen animal cells in the animal cell cryopreservation solution by elevating a temperature.

[Temperature Lowering and Crystallization]

In order to prevent damage to the animal cells, it is preferable that the animal cells can be frozen while maintaining a vitrified state (an amorphous state) without generation of crystallization in the cryopreservation solution when lowering the temperature to freeze the animal cells. Although crystallization hardly occurs if the cooling rate is increased, the increase in the cooling rate will involve increased constraints on handling of the cells. Therefore, this will be a difficult alternative for three-dimensional cell structures, tissues, organs and the like which have larger heat capacity and uneven thermal conductivity, because of cracks due to the increased cooling rate, tissue destruction due to formation of cracks and the like. According to the present invention, the freezing in the vitrified state is possible without generation of crystallization, for example by selecting the cooling rate from ranges of from 5° C./min to 50° C./min, and from 10° C./min to 30° C./min. The presence or absence of generation of crystallization can be detected by DSC measurement as shown in Examples.

[Temperature Elevating and Recrystallization]

Even if the animal cells have been frozen in the vitrified state, the vitrified state may be broken and recrystallization of the cryopreservation solution may occur when the frozen animal cells are thawed by elevating the temperature. Therefore, it is preferable that the frozen animal cells can be thawed while preventing recrystallization, in order to prevent damage to the animal cells due to cryopreservation. Although recrystallization hardly occurs if the heating rate is increased, the increase in the heating rate will involve increased constraints on handling of the cells, as with the case of the cooling rate. Therefore, this will be a difficult alternative for three-dimensional cell structures, tissues, organs and the like which have larger heat capacity and uneven thermal conductivity, because of cracks due to the increased heating rate, tissue destruction due to formation of cracks and the like. According to the present invention, the animal cells can be thawed while maintaining the vitrified state without generation of recrystallization, for example by selecting the heating rate from ranges of from 5° C./min to 100° C./min, from 5° C./min to 50° C./min and from 10° C./min to 50° C./min. The presence or absence of generation of recrystallization can be detected by DSC measurement as shown in Examples.

[Vitrification Ability]

The vitrification ability as used herein refers to the ability to maintain the vitrified state to prevent recrystallization, which may be, for example, the ability to prevent crystallization during the temperature lowering and/or the ability to prevent recrystallization during the temperature elevating. The improved vitrification ability can be achieved as long as the ability is sufficient during either the temperature lowering or the temperature elevating. By using the animal cell cryopreservation solution having the improved vitrification ability, good cryopreservation can be achieved even for the three-dimensional cell structures, tissues, organs and the like which have larger heat capacity and uneven thermal conductivity. Therefore, the animal cell cryopreservation solution according to the present invention is suitable for use in the animal cells in the form of a three dimensional cell structure, tissue, organ or the like. According to the animal cell cryopreservation solution of the present invention, the animal cells can be frozen, preserved and thawed with higher viability.

EXAMPLES

Hereinafter, the present invention will be described in detail with reference to Examples. However, the present invention is not limited to Examples illustrated below. It should be noted that in Examples, "%" and "parts" represent % by weight and parts by weight, respectively, unless otherwise specified.

[Synthesis of COOH-PLL]

Succinic anhydride (SA, TOKYO CHEMICAL INDUSTRY CO., LTD.) was added to ε-poly-L-lysine (25% aqueous solution, JNC, an average molecular weight of 4000) such that an amount of the former was from 15 to 50 mol % (or from 15 to 65 mol %) relative to the amino groups of the latter, and reacted at 50° C. for 1 hour to prepare a carboxylated polylysine (COOH-PLL). It should be noted that when used at a concentration of 10% by weight in terms of the amount of ε-poly-L-lysine (PLL) which is the starting material, the concentration corresponds to 25 mM based on the value of the average molecular weight of PLL of 4000, and so, for example, in the case of 10% by weight in terms of PLL, hereinafter, the concentration of COOH-PLL may be shown as 25 mM. Hereinafter, the carboxylated polylysine may be referred to as SA-PLL or COOH-PLL. The amount of the carboxyl groups introduced into COOH-PLL is 65% relative to the amino groups in the side chains of ε-poly-L-lysine, which may be referred to as PLL(0.65) or SA(65)-PLL, unless otherwise noted. The reaction formula for synthesis of the COOH-PLL is shown in FIG. 16.

[Synthesis of BSA-PLL]

Butylsuccinic anhydride (BSA, TOKYO CHEMICAL INDUSTRY CO., LTD.) was added to ε-poly-L-lysine (25% aqueous solution, JNC, an average molecular weight of 4000) such that an amount of the former was from 15 to 50 mol % (or from 15 to 65 mol %) relative to the amino groups of the latter, and reacted at 50° C. for 1 hour to prepare a butylcarboxylated polylysine (BSA-PLL). It should be noted that when used at a concentration of 10% by weight in terms of the amount of ε-poly-L-lysine (PLL) which is the starting material, the concentration corresponds to 25 mM based on the value of the average molecular weight of PLL of 4000, and so, for example, in the case of 10% by weight in terms of PLL, hereinafter, the concentration of BSA-PLL may be shown as 25 mM. The reaction formula for synthesis of the BSA-PLL is shown below. In the formula, the upper stage represents reactants and the lower stage represents a product.

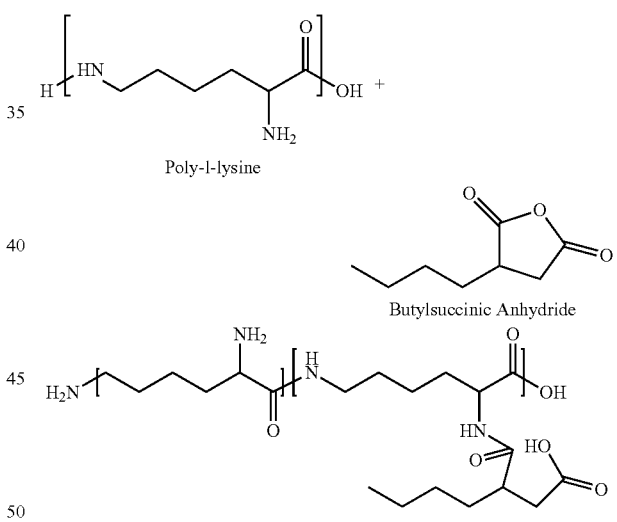

[Synthesis of BSA-SA-PLL]

The amino groups of ε-poly-L-lysine (25% aqueous solution, JNC, an average molecular weight of 4000) was carboxylated with butylsuccinic anhydride as stated above, and further carboxylated with succinic anhydride (SA) to prepare a butylcarboxylated-carboxylated-polylysine (BSA-SA-PLL). The numbers within the parentheses in the abbreviations as described below indicate the incorporated rates of the respective carboxyl groups to the amino groups of polylysine. For example, BSA(35)-SA(30)-PLL refers to a polyampholyte resulting from reaction of 35% of the amino groups with BSA and 30% of the amino groups with SA, among the amino groups of polylysine. In this case, the total amount of incorporated carboxyl groups is 65%. Additionally, BSA(15)-SA(50)-PLL and BSA(50)-SA(15)-PLL were also synthesized. It should be noted that the simple expression "BSA-PLL" means BSA(50)-PLL in which 50% of the amino groups of PLL was substituted with BSA and PLL did not react with SA. It also should be noted that when used at a concentration of 10% by weight in terms of the amount of ε-poly-L-lysine (PLL) which is the starting material, the concentration corresponds to 25 mM based on the value of the average molecular weight of PLL of 4000, and so, for example, in the case of 10% by weight in terms of PLL, hereinafter, the concentration of BSA-SA-PLL may be shown as 25 mM.

[Synthesis of DMGA-PLL]

3,3-dimethylglutaric anhydride (DMGA, Sigma Aldrich) was added to ε-poly-L-lysine (25% aqueous solution, JNC, an average molecular weight of 4000) such that an amount of the former was from 15 to 50 mol % (or from 15 to 65 mol %) relative to the amino groups of the latter, and reacted at 50° C. for 1 hour to prepare a dimethyl glutar carboxylated polylysine (DMGA-PLL) (3,3-dimethyl glutarated polylysine anhydride). It should be noted that when used at a concentration of 10% by weight in terms of the amount of ε-poly-L-lysine (PLL) which is the starting material, the concentration corresponds to 25 mM based on the value of the average molecular weight of PLL of 4000, and so, for example, in the case of 10% by weight in terms of PLL, hereinafter, the concentration of DMGA-PLL may be shown as 25 mM. The structural formula of 3,3-dimethylglutaric anhydride (DMGA) is shown below. (The reaction formula for synthesis of the DMGA-PLL is shown below. Those skilled in the art will understand that the two kinds of repeating units in the structural formula of DMGA-PLL do not necessarily appear regularly or periodically as a result of the modification reaction with DMGA in the chains of ε-poly-L-lysine, and ordinarily define only the proportion of the units present in the chains of the polymer. That is, the repeating values X and Y means a molar fraction of each partial structure in the molecule. A ratio of Y/(X+Y) is the content rate of repeating units modified with DMGA, and may be, for example in the range of from 0.5 to 0.70, or from 0.5 to 0.65.)

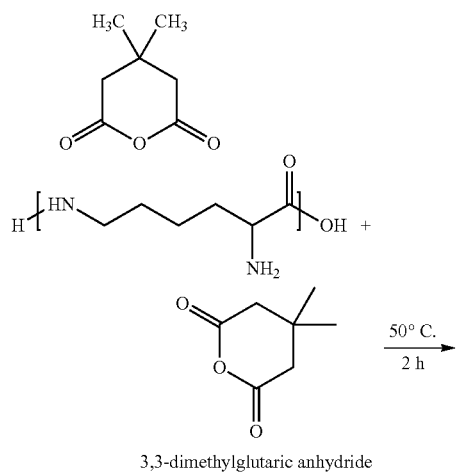

3,3-dimethylglutaric anhydride

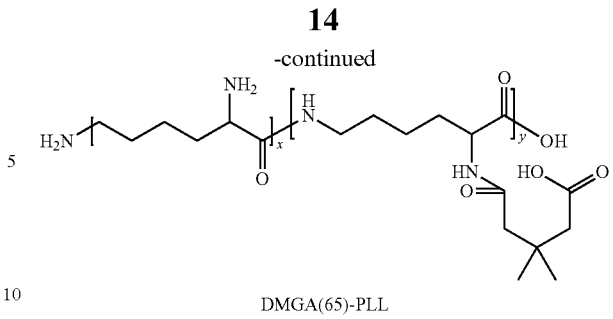

DMGA(65)-PLL

[Preparation of Vitrifying Solution]

Each vitrifying solution was prepared by providing a mixed solution of ethylene glycol (EG) and sucrose (a phosphate buffer PBS solution) as a base solution and adjusting a final concentration of each carboxylated polylysine therein to 12.5 mM. The concentration of sucrose was fixed at 0.5 M and the concentration of EG was varied from 4M to 6.5 M.

[DSC Measurement]

Each vitrifying solution was evaluated by a differential scanning calorimeter (DSC) (product name DSC 6200 available from Seiko Instruments Inc.) as follows.

10 μL of each vitrifying solution was placed on an aluminum pan for DSC, and the temperature was lowered to −120° C. at a cooling rate of 10° C./min by means of liquid nitrogen, and the presence or absence of crystallization was confirmed from the presence or absence of a peak in a graph of the DSC measurement. The temperature was elevated from that temperature to room temperature at a heating rate of 10° C./min, and the presence or absence of recrystallization was confirmed from the presence or absence of a peak in a graph of the DSC measurement.

Comparative Example 1

[Evaluation of Recrystallization of Conventional Vitrifying Solution by DSC]

Once the conventional vitrifying solutions were frozen with liquid nitrogen, their characteristics were evaluated by the DSC measurement procedures as stated above, with the exception that the heating rate was 50° C./min. The conventional vitrifying solutions used are as follows. Results of the DSC measurement are shown in FIG. 1.

DAP213: an aqueous solution containing 2 M of DMSO, 1 M of acetamide, and 3 M of propylene glycol;

EG6.5M-Suc0.75M: an aqueous solution containing 6.5 M of ethylene glycol and 0.75 M of sucrose;

EG6.5M-Suc0.75M-PLL(0.65) 10%: an aqueous solution containing 6.5 M of ethylene glycol, 0.75 M of sucrose and 10% by weight of SA(65)-PLL.

FIG. 1 is a graph showing results of DSC measurement of the conventional vitrifying solutions at the heating rate of 50° C./min. For DAP, an exothermic peak indicating generation of recrystallization was observed. For EG6.5M-Suc0.75M, an exothermic peak indicating generation of recrystallization was observed as well. For convenience of confirmation in the graph, each of these exothermic peaks was enclosed with an ellipse. For the vitrifying solution to which PLL(0.65) was added, i.e., EG6.5M-Suc0.75M-PLL (0.65) 10%, no exothermic peak indicating generation of recrystallization was observed.

Example 1

[Crystallization Test of Vitrifying Solution by DSC]

Characteristics of crystallization of each vitrifying solution were evaluated by the DSC measurement procedures as stated above, with the exception that the cooling rate was 10° C./min and the heating rate was 10° C./min. The vitrifying solutions used are as follows. Results of DSC measurement are shown in FIG. 2a (COOH-PLL), FIG. 2b (BSA-PLL) and FIG. 2c (BSA(35)-SA(30)-PLL), respectively.

COOH-PLL: an aqueous solution containing 25 mM of SA(65)-PLL, 6 M of ethylene glycol and 0.5 M of sucrose;

BSA-PLL: an aqueous solution containing 25 mM of BSA(65)-PLL, 6 M of ethylene glycol and 0.5 M of sucrose;

BSA(35)-SA(30)-PLL: an aqueous solution containing 25 mM of BSA(35)-SA(30)-PLL, 6 M of ethylene glycol and 0.5 M of sucrose.

FIG. 2a is a graph showing the result of crystallization evaluation by DSC measurement of the vitrifying solution containing COOH-PLL. In the temperature lowering process (the upper half of the graph), a peak indicating crystallization was observed around −70° C. to −80° C. That is, crystallization was generated due to the temperature lowering.

FIG. 2b is a graph showing the result of crystallization evaluation by DSC measurement of the vitrifying solution containing BSA-PLL. No peak indicating crystallization was observed in the temperature lowering process (the upper half of the graph). That is, the vitrified state was obtained without generation of crystallization due to the temperature lowering.

FIG. 2c is a graph showing the result of crystallization evaluation by DSC measurement of the vitrifying solution containing BSA(35)-SA(30)-PLL. No peak indicating crystallization was observed in the temperature lowering process (the upper half of the graph). That is, the vitrified state was obtained without generation of crystallization due to the temperature lowering.

Example 2

[Crystallization Test of Vitrifying Solution by DSC]

Characteristics of crystallization of each vitrifying solution were evaluated by the DSC measurement procedures as stated above, with the exception that the cooling rate was 10° C./min and the heating rate was 10° C./min. The vitrifying solutions used are as follows. These were vitrifying solutions in which the concentration of ethylene glycol in BSA-PLL of Example 1 was decreased from 6 M to 5 M and 4.5 M, respectively. Results of DSC measurement are shown in FIG. 3a (BSA-PLL, EG5M) and FIG. 3b (BSA-PLL, EG4.5M), respectively.

BSA-PLL, EG5M: an aqueous solution containing 25 mM of BSA(65)-PLL, 5 M of ethylene glycol and 0.5 M of sucrose;

BSA-PLL, EG4.5M: an aqueous solution containing 25 mM of BSA(65)-PLL, 4.5 M of ethylene glycol and 0.5 M of sucrose.

FIG. 3a is a graph showing the result of crystallization evaluation by DSC measurement of the vitrifying solution containing BSA-PLL, EG5M. No peak indicating crystallization was observed in the temperature lowering process (the upper half of the graph). That is, the vitrified state was obtained without generation of crystallization due to the temperature lowering.

FIG. 3b is a graph showing the result of crystallization evaluation by DSC measurement of the vitrifying solution containing BSA-PLL, EG4.5M. In the temperature lowering process (the upper half of the graph), a peak indicating crystallization was observed.

Example 3

[Crystallization Test of Vitrifying Solution by DSC]

Characteristics of crystallization of each vitrifying solution were evaluated by the DSC measurement procedures as stated above, with the exception that the cooling rate was 10° C./min and the heating rate was 10° C./min. The vitrifying solutions used are as follows. This was a vitrifying solution in which the concentration of ethylene glycol in BSA(35)-SA(30)-PLL of Example 1 was decreased from 6 M to 5.5 M. Results of DSC measurement are shown in FIG. 4 (BSA(35)-SA(30)-PLL, EG5.5M).

BSA(35)-SA(30)-PLL: an aqueous solution containing 25 mM of BSA(35)-SA(30)-PLL, 5.5 M of ethylene glycol and 0.5 M of sucrose.

FIG. 4 is a graph showing the result of crystallization evaluation by DSC measurement of the vitrifying solution containing BSA(35)-SA(30)-PLL, EG5.5M. No peak indicating crystallization was observed in the temperature lowering process (the upper half of the graph). That is, the vitrified state was obtained without generation of crystallization due to the temperature lowering.

Example 4

[Recrystallization Test of Vitrifying Solution by DSC]

Characteristics of crystallization of each vitrifying solution were evaluated by the DSC measurement procedures as stated above, with the exception that the cooling rate was 10° C./min and the heating rate was 40° C./min. The vitrifying solutions used are as follows. Results of DSC measurement are shown in FIG. 5a (COOH-PLL), FIG. 5b (BSA-PLL) and FIG. 5c (BSA(35)-SA(30)-PLL), respectively.

COOH-PLL: an aqueous solution containing 25 mM of SA(65)-PLL, 6.5 M of ethylene glycol and 0.5 M of sucrose;

BSA-PLL: an aqueous solution containing 25 mM of BSA(65)-PLL, 6 M of ethylene glycol and 0.5 M of sucrose;

BSA(35)-SA(30)-PLL: an aqueous solution containing 25 mM of BSA(35)-SA(30)-PLL, 6.5 M of ethylene glycol and 0.5 M of sucrose.

FIG. 5a is a graph showing the result of recrystallization evaluation by DSC measurement of the vitrifying solution containing COOH-PLL. In the temperature elevating process (the lower half of the graph), a peak indicating recrystallization was observed around −50° C. to −20° C. That is, recrystallization was generated due to the temperature elevating.

FIG. 5b is a graph showing the result of recrystallization evaluation by DSC measurement of the vitrifying solution containing BSA-PLL. No peak indicating recrystallization was observed in the temperature elevating process (the lower half of the graph). That is, the vitrified state transferred to a liquid state without generation of recrystallization due to the temperature elevating.

FIG. 5c is a graph showing the result of recrystallization evaluation by DSC measurement of the vitrifying solution containing BSA(35)-SA(30)-PLL. No peak indicating recrystallization was observed in the temperature elevating process (the lower half of the graph). That is, the vitrified state transferred to a liquid state without generation of recrystallization due to the temperature elevating.

Example 5

[Cell Viability Test]

Cytotoxicity of each vitrifying solution was evaluated by the following cell viability test.

MSCs (mesenchymal stem cells) (Riken BioResource Center) were cultured on a petri dish to prepare a cell sheet. The prepared cell sheet was then immersed in each vitrifying solution as described below at 0° C. for 20 minutes. The cell sheet was then stained with Tripan Blue and then observed by an inverted phase contrast microscope to measure viability.

Results obtained for the following vitrifying solutions are shown in FIG. 6a:
BSA-PLL: an aqueous solution containing 25 mM of BSA(65)-PLL, 5 M of ethylene glycol and 0.5 M of sucrose;
COOH-PLL: an aqueous solution containing 25 mM of SA(65)-PLL, 6.5 M of ethylene glycol and 0.5 M of sucrose;
Control: an aqueous solution containing 5 M of ethylene glycol and 0.5 M of sucrose.

Results obtained for the following vitrifying solutions are shown in FIG. 6b:
BSA-SA-PLL: an aqueous solution containing 25 mM of BSA(35)-SA(30)-PLL, 5.5 M of ethylene glycol and 0.5 M of sucrose;
COOH-PLL: an aqueous solution containing 25 mM of SA(65)-PLL, 6.5 M of ethylene glycol and 0.5 M of sucrose;
Control: an aqueous solution containing 5 M of ethylene glycol and 0.5 M of sucrose.

FIGS. 6a and 6b are graphs showing cell viability in each vitrifying solution. BSA-SA-PLL exhibited improved cell viability as compared with that of BSA-PLL and had a viability value higher than that of each of COOH-PLL and Control.

[Summary of Results of Examples 1 to 5 and Comparative Example 1]

For COOH-PLL in which 65% of the amino groups was carboxylated only with succinic anhydride, the concentration of EG required for suppressing crystallization in the temperature lowering process was 6.5 M, whereas for BSA-PLL, vitrification was possible even if the concentration of EG was decreased to 5 M. This demonstrated the improved vitrification ability of BSA-PLL.

When BSA(35)-SA(30)-PLL was used, vitrification could be observed even if the concentration of EG was decreased to 5.5 M. The higher concentration of BSA led to higher vitrification ability, but it tended to slightly decreased cell viability (slightly increased cytotoxicity). However, BSA (35)-SA(30)-PLL exhibited sufficient high cell viability.

In the temperature elevating process at the heating rate of 40° C./min, recrystallization was observed for COOH-PLL, whereas the peak of recrystallization disappeared for BSA-PLL. Thus, it was found that BSA-PLL also suppressed recrystallization, demonstrating the stability of the vitrified state.

Example 6

[Crystallization Test of Vitrifying Solution by DSC]

Characteristics of crystallization of each vitrifying solution were evaluated by the DSC measurement procedures as stated above, with the exception that the cooling rate was 10° C./min and the heating rate was 10° C./min. The vitrifying solutions used are as follows. Results of DSC measurement are shown in FIG. 7a (DMGA-PLL, EG6M), FIG. 7b (DMGA-PLL, EG5M), FIG. 7c (DMGA-PLL, EG4.5 M) and FIG. 7d (DMGA-PLL, EG4M), respectively.

DMGA-PLL, EG6M: an aqueous solution containing 25 mM of DMGA(65)-PLL, 6 M of ethylene glycol and 0.5 M of sucrose;
DMGA-PLL, EG5M: an aqueous solution containing 25 mM of DMGA(65)-PLL, 5 M of ethylene glycol and 0.5 M of sucrose;
DMGA-PLL, EG4.5M: an aqueous solution containing 25 mM of DMGA(65)-PLL, 4.5 M of ethylene glycol and 0.5 M of sucrose;
DMGA-PLL, EG4M: an aqueous solution containing 25 mM of DMGA(65)-PLL, 4 M of ethylene glycol and 0.5 M of sucrose.

FIG. 7a is a graph showing the result of crystallization evaluation by DSC measurement of the vitrifying solution containing DMGA-PLL, EG6M. No peak indicating crystallization was observed in the temperature lowering process (the upper half of the graph). That is, the vitrified state was obtained without generation of crystallization due to the temperature lowering.

FIG. 7b is a graph showing the result of crystallization evaluation by DSC measurement of the vitrifying solution containing DMGA-PLL, EG5M. No peak indicating crystallization was observed in the temperature lowering process (the upper half of the graph). That is, the vitrified state was obtained without generation of crystallization due to the temperature lowering.

FIG. 7c is a graph showing the result of crystallization evaluation by DSC measurement of the vitrifying solution containing DMGA-PLL, EG4.5M. No peak indicating crystallization was observed in the temperature lowering process (the upper half of the graph). That is, the vitrified state was obtained without generation of crystallization due to the temperature lowering.

FIG. 7d is a graph showing the result of crystallization evaluation by DSC measurement of the vitrifying solution containing DMGA-PLL, EG4M. In the temperature lowering process (the upper half of the graph), a peak indicating crystallization was observed around −50° C. to −60° C.

Example 7

As Example 7, an experiment that will be described below was carried out. Other conditions were the same as those described in Example 1, unless otherwise noted.

[Preparation of Vitrifying Solution]

Each vitrifying solution was prepared by providing a mixed solution of ethylene glycol (EG) and sucrose (PBS) as a base solution and adjusting a final concentration of each carboxylated polylysine therein to 25 mM. The concentration of sucrose (Su) was fixed at 0.5 M and the concentration of EG was varied from 4M to 6.5 M. The compositions of the vitrifying solutions used are as follows:

Control: 0.5 M of Su, 6.5 M of EG: FIG. 8;
25 mM of SA-PLL (COOH-PLL), 0.5 M of Su, 6.5 M of EG: FIG. 9;
25 mM of COOH-PLL, 0.5 M of Su, 5.5 M of EG: FIG. 10a;
25 mM of COOH-PLL, 0.5 M of Su, 5 M of EG: FIG. 10b;

25 mM of BSA-PLL, 0.5 M of Su, 5 M of EG: FIG. 11a;
25 mM of BSA-PLL, 0.5 M of Su, 4.5 M of EG: FIG. 11b;
25 mM of DMGA-PLL, 0.5 M of Su, 4.5 M of EG: FIG. 12a;
25 mM of DMGA-PLL, 0.5 M of Su, 4 M of EG: FIG. 12b;
25 mM of COOH-PLL, 0.5 M of Su, 6 M of EG: FIG. 13a;
25 mM of BSA-PLL, 0.5 M of Su, 6 M of EG: FIG. 13b;
25 mM of DMGA-PLL, 0.5 M of Su, 6 M of EG: FIG. 13c.

[DSC Measurement]

Each vitrifying solution was evaluated as follows:

10 μL of each vitrifying solution was placed on an aluminum pan for DSC, and the temperature was lowered to −170° C. at a cooling rate of 10° C./min by means of liquid nitrogen, and the presence or absence of crystallization and vitrification was confirmed. Further, the temperature was elevated from that temperature to room temperature at a heating rate of 10° C./min, and the presence or absence of recrystallization was confirmed.

FIG. 8 shows a DSC curve when the temperature of a solution containing 6.5 M of EG and 0.5 M sucrose with no polyampholyte as a vitrifying solution was lowered and elevated at 10° C./min, and FIG. 9 shows a DSC curve when the temperature of a solution containing 25 mM of COOH-PLL, 6.5 M of EG and 0.5 M of sucrose was lowered and elevated at 10° C./min. Referring to FIG. 8, when no polyampholyte was present, a peak of crystallization was observed at around −90° C. and a peak of melting was observed at around −30° C. On the other hand, when COOH-PLL was added, no peak of crystallization was observed, and a glass transition point was observed around −130° C., indicating that the solution was vitrified. Further, during the temperature elevating, a peak of recrystallization was also observed around −60° C.

FIGS. 10a and 10b show the results when the EG concentrations of the COOH-PLL-added vitrifying solution were decreased to 5.5 M and 5.0 M. Vitrification was observed at the concentration of 5.5 M, whereas a crystallization peak was observed at the concentration of 5 M. It was found that the effect of suppressing crystallization by COOH-PLL was exerted at the concentration of EG of 5.5 M or more.

On the one hand, it was found from FIGS. 11a and 11b that the EG concentration which could suppress crystallization by BSA-PLL was 5 M. It was found from FIGS. 12a and 12b that the EG concentration which could suppress crystallization by DMGA-PLL was 4.5 M. It was confirmed that the effect of suppressing crystallization by BSA-PLL was exerted at the concentration of EG of 5 M or more. On the other hand, it was found that the effect of suppressing crystallization by DMGA-PLL was exerted at the concentration of EG of 4.5 M or more. These results demonstrated that among the synthesized and compared polyampholytes, DMGA-PLL had the highest effect of suppressing crystallization.

FIGS. 13a, 13b, and 13c show results of DSC of solutions containing three polyampholytes, 6.0 M of EG and 0.5 M of sucrose. It was found that for all the polyampholytes, crystallization was not generated, and vitrification was generated at this concentration of EG. On the other hand, as can be seen from FIGS. 13a and 13b, recrystallization was observed during the temperature elevating for COOH-PLL and BSA-PLL, whereas as can be seen from FIG. 13c, no recrystallization was observed for DMGA-PLL. These results demonstrated that DMGA-PLL had higher effects of suppressing crystallization and recrystallization than those of the other polyampholytes.

Example 8

[Cell Viability Test]

Next, a sheet of human mesenchymal stem cells (MSCs) (Riken BioResource Center) was vitrified and preserved in the vitrifying solutions using those polyampholytes and an experiment for confirming cell viability was carried out by the following procedures. An explanatory diagram showing the outline of the procedures of this experiment is shown in FIG. 17. Compositions of the vitrifying solutions used are as follows:

Control: 6 M of EG, 0.5 M of Su: FIG. 14a;
COOH-PLL: 25 mM of COOH-PLL, 6 M of EG, 0.5 M of Su: FIG. 14b;
BSA-PLL: 25 mM of BSA-PLL, 6 M of EG, 0.5 M of Su: FIG. 14c;
DMGA-PLL: 25 mM of DMGA-PLL, 6 M of EG, 0.5 M of Su: FIG. 14d;
Control: 6 M of EG, 0.5 M of Su: a in FIG. 15;
COOH-PLL: 25 mM of COOH-PLL, 6 M of EG, 0.5 M of Su: b in FIG. 15;
BSA-PLL: 25 mM of BSA-PLL, 6 M of EG, 0.5 M of Su: c in FIG. 15;
DMGA-PLL: 25 mM of DMGA-PLL, 6 M of EG, 0.5 M of Su: d in FIG. 15.

MSCs were cultured using Dulbecco's Modified Eagle's Medium (DMEM) supplemented with 10% fetal bovine serum in an incubator at 37° C. After being in a confluent state on a 3.5 cm cell culture dish (IWAKI), the cells were continuously cultured for one week to obtain an MSC sheet which was used for the experiment.

After the culture solution was removed, 2 mL of a 20% EG/DMEM solution was added to the MSC sheet, and left at room temperature for 25 minutes to equilibrate it. After removing the solution, 500 μL of each vitrifying solution was then added at a freezing temperature and left for 20 minutes. Subsequently, the culture dish was maintained at a position of 1 cm from a vapor of liquid nitrogen and freezing was carried out. It has been known that a freezing rate can be controlled by the distance from the vapor of liquid nitrogen at this time, and that a freezing rate of about 10° C./min can be obtained at the position of 1 cm from the vapor. The culture dish was then allowed to stand in a steam atmosphere for 10 minutes and sufficiently solidified, and then immersed in liquid nitrogen to complete the freezing. Subsequently, thawing operation was carried out. The thawing was carried out by adding 3 ml of a 1 M sucrose/DMEM solution warmed to 37° C. to the MSC sheet culture dish taken out from liquid nitrogen and removing the solution after one minute. Then, 3 mL of a 0.5 M sucrose/DMEM solution was added and removed after 3 minutes. Subsequently, 3 mL of DMEM was added, removal was repeated twice after 5 minutes, and finally 2 mL of DMEM was added and culturing was carried out in an incubator at 37° C. The next day, cell viability was evaluated by a Live/Dead assay.

Results of this experiment are shown in FIGS. 14a, 14b, 14c and 14d. FIGS. 14a to 14d are fluorescent microscopy photographs of double-stained cell sheets frozen and thawed by the above procedures using the respective vitrifying solutions, and each bar at the lower right of the visual field shows 100 μm. By the Live/Dead assay, living cells were stained in green color with Calsein AM and dead cells were stained in red color with an ethidium homodimer. Viability was determined by counting the number of living cells (green-stained cells) and dead cells (red-stained cells) in the visual fields in FIGS. 14a, 14b, 14c and 14d, respectively. The vitrifying solution with no polyampholyte (FIG. 14a) exhibited viability of about 30%, whereas the COOH-PLL system (FIG. 14b) exhibited viability of about 75%, the BSA-PLL system (FIG. 14c) exhibited viability of about 55%, and the DMGA-PLL system (FIG. 14d) exhibited viability of about 93%. A bar graph was created from these values, which is shown in FIG. 15. The horizontal axes a, b, c, and d in FIG. 15 correspond to a, b, c, and d in FIG. 14, respectively. The results demonstrated an outstanding effect of DMGA-PLL.

INDUSTRIAL APPLICABILITY

According to the present invention, an animal cell cryopreservation solution having an improved vitrification ability can be obtained. The present invention is an industrially useful invention.

What is claimed is:

1. A vitrified state stabilizing agent for an animal cell cryopreservation solution, comprising:
at least one polyampholyte comprising amino groups and carboxyl groups in the same molecule, the at least one polyampholyte being at least one carboxylated polyampholyte resulting from reaction of ε-poly-L-lysine with a compound represented by the following formula (II):

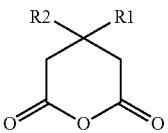

Formula (II)

in which R1 and R2 each represent a methyl group.

2. The vitrified state stabilizing agent for the animal cell cryopreservation solution according to claim 1, wherein the at least one polyampholyte has a percentage of carboxylated amino groups among the amino groups in the side chains of ε-poly-L-lysine, in the range of from 50% to 75%.

3. An animal cell cryopreservation solution comprising a physiological solution containing the vitrified state stabilizing agent for the animal cell cryopreservation solution according to claim 1.

4. An animal cell cryopreservation solution comprising a physiological solution containing 2 to 40% by weight of the vitrified state stabilizing agent for the animal cell cryopreservation solution according to claim 1, and containing ethylene glycol or propylene glycol at a concentration of from 3 to 8 M.

5. The animal cell cryopreservation solution according to claim 4, further containing sucrose at a concentration of from 0.1 to 1 M.

6. The animal cell cryopreservation solution according to claim 3, wherein the animal cell cryopreservation solution comprises an animal cell vitrified state cryopreservation solution.

7. A method for cryopreserving animal cells, comprising the steps of:
immersing the animal cells in the animal cell cryopreservation solution according to claim 3; and
freezing the animal cells in the animal cell cryopreservation solution by lowering a temperature.

8. The method for cryopreserving the animal cells according to claim 7, further comprising, after the step of freezing the animal cells in the animal cell cryopreservation solution by lowering the temperature, a step of thawing the frozen animal cells in the animal cell cryopreservation solution by elevating a temperature.

9. The method for cryopreserving the animal cells according to claim 7, wherein the step of freezing the animal cells in the animal cell cryopreservation solution by lowering the temperature comprises freezing the animal cells in a vitrified state by lowering the temperature.

10. The method for cryopreserving the animal cells according to claim 8, wherein the step of thawing the frozen animal cells in the animal cell cryopreservation solution by elevating the temperature comprises thawing the animal cells by elevating the temperature without recrystallization.

11. The method for cryopreserving the animal cells according to claim 7, wherein the step of freezing the animal cells in the animal cell cryopreservation solution by lowering the temperature comprises freezing the animal cells by lowering the temperature at a cooling rate of from 5° C./min to 50° C./min.

12. The method for cryopreserving the animal cells according to claim 8, wherein the step of thawing the frozen animal cells in the animal cell cryopreservation solution by elevating the temperature comprises thawing the frozen animal cells by elevating the temperature at a heating rate of from 5° C./min to 100° C./min.

* * * * *